US012244058B2

(12) United States Patent
Kim

(10) Patent No.: US 12,244,058 B2
(45) Date of Patent: Mar. 4, 2025

(54) ANTENNA SYSTEM MOUNTED IN VEHICLE

(71) Applicant: LG ELECTRONICS INC., Seoul (KR)

(72) Inventor: Yongkon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 17/792,529

(22) PCT Filed: Jan. 13, 2020

(86) PCT No.: PCT/KR2020/000564
§ 371 (c)(1),
(2) Date: Jul. 13, 2022

(87) PCT Pub. No.: WO2021/145463
PCT Pub. Date: Jul. 22, 2021

(65) Prior Publication Data
US 2023/0066184 A1 Mar. 2, 2023

(51) Int. Cl.
*H01Q 1/32* (2006.01)
*H01Q 1/42* (2006.01)
(Continued)

(52) U.S. Cl.
CPC ......... *H01Q 1/3275* (2013.01); *H01Q 1/3241* (2013.01); *H01Q 1/42* (2013.01);
(Continued)

(58) Field of Classification Search
CPC .................. H01Q 1/3275; H01Q 1/3241
See application file for complete search history.

(56) References Cited

U.S. PATENT DOCUMENTS

| 11,699,856 B1 * | 7/2023 | Hill | H01Q 9/42 343/702 |
| 2007/0013593 A1 * | 1/2007 | Zafar | H01Q 1/3275 343/700 MS |

(Continued)

FOREIGN PATENT DOCUMENTS

| KR | 10-0948265 | 3/2010 |
| KR | 10-2017-0025846 | 3/2017 |

(Continued)

OTHER PUBLICATIONS

PCT International Application No. PCT/KR2020/000564, International Search Report dated Oct. 12, 2020, 5 pages.

*Primary Examiner* — Ab Salam Alkassim, Jr.
(74) *Attorney, Agent, or Firm* — LEE, HONG, DEGERMAN, KANG & WAIMEY

(57) ABSTRACT

Provided is an antenna system mounted in a vehicle according to one embodiment. The antenna system may comprise a circuit board disposed in a metal frame disposed inside a roof or a roof frame of the vehicle. The antenna system may further comprise a first antenna connected to a first feeding part of the circuit board and configured to radiate a first signal through a first metal patch disposed on a front surface and one side of a dielectric carrier. The antenna system may further comprise a second antenna connected to a second feeding part of the circuit board and configured to radiate a second signal through a second metal patch disposed on the front surface and the one side of the dielectric carrier.

20 Claims, 22 Drawing Sheets

(51) Int. Cl.
*H01Q 5/307* (2015.01)
*H01Q 9/04* (2006.01)
*H01Q 21/28* (2006.01)
*H01Q 25/00* (2006.01)
*H04B 7/0413* (2017.01)

(52) U.S. Cl.
CPC ............ *H01Q 5/307* (2015.01); *H01Q 9/045* (2013.01); *H01Q 21/28* (2013.01); *H01Q 25/005* (2013.01); *H04B 7/0413* (2013.01)

(56) References Cited

U.S. PATENT DOCUMENTS

| | | | | |
|---|---|---|---|---|
| 2012/0274519 A1* | 11/2012 | Chakam | ............... | H01Q 1/3275 343/702 |
| 2015/0123854 A1* | 5/2015 | Chakam | ............... | H01Q 1/1214 343/702 |
| 2017/0317409 A1* | 11/2017 | Ayatollahi | ............. | H01Q 21/28 |
| 2019/0027818 A1* | 1/2019 | Ortigosa | ................ | H01Q 1/246 |
| 2019/0089419 A1* | 3/2019 | Kim | ........................ | H01Q 21/28 |
| 2020/0185818 A1* | 6/2020 | Kim | ........................ | H01Q 1/241 |
| 2020/0185819 A1* | 6/2020 | Kim | ........................ | H04B 7/0413 |
| 2021/0111491 A1* | 4/2021 | Hasegawa | ............ | H01Q 19/005 |
| 2021/0359405 A1* | 11/2021 | Yamashita | ............ | H01Q 1/3291 |
| 2022/0094044 A1* | 3/2022 | Yun | ........................ | H01Q 5/307 |
| 2022/0209400 A1* | 6/2022 | Ryu | ........................ | H01Q 9/045 |
| 2022/0255213 A1* | 8/2022 | Ryu | ........................ | H01Q 5/20 |
| 2022/0320736 A1* | 10/2022 | Jung | ........................ | H01Q 5/40 |
| 2022/0336946 A1* | 10/2022 | Ryu | ........................ | H01Q 1/3275 |
| 2022/0368009 A1* | 11/2022 | Ryu | ........................ | H01Q 1/523 |
| 2022/0384955 A1* | 12/2022 | Kim | ........................ | H01Q 5/307 |
| 2022/0407233 A1* | 12/2022 | Woo | ........................ | H01Q 1/48 |
| 2022/0416423 A1* | 12/2022 | Kim | ........................ | H01Q 21/28 |
| 2023/0009333 A1* | 1/2023 | Yun | ........................ | H04B 7/0413 |
| 2023/0012197 A1* | 1/2023 | Yun | ........................ | H04B 7/0413 |
| 2023/0031896 A1* | 2/2023 | Kim | ........................ | H01Q 1/325 |
| 2023/0066694 A1* | 3/2023 | Kowaita | ................ | H01Q 1/50 |
| 2023/0094098 A1* | 3/2023 | Kim | ........................ | H01Q 21/28 343/713 |
| 2023/0099552 A1* | 3/2023 | Kim | ........................ | H04B 7/0413 375/267 |
| 2023/0163450 A1* | 5/2023 | Lee | ........................ | H01Q 1/48 343/702 |
| 2023/0163471 A1* | 5/2023 | Kim | ........................ | H01Q 9/42 343/713 |
| 2023/0198553 A1* | 6/2023 | Kim | ........................ | H01Q 1/02 370/329 |
| 2023/0238704 A1* | 7/2023 | Kim | ........................ | H01Q 1/46 343/702 |
| 2023/0253712 A1* | 8/2023 | Hara | ........................ | H01Q 9/30 343/713 |

FOREIGN PATENT DOCUMENTS

KR 10-2018-0044864 5/2018
WO WO-2021228332 A1 * 11/2021 ........... H01Q 1/1271

* cited by examiner

FIG. 7C

| | Function | Frequency |
|---|---|---|
| RKE 1 | RKE 1 | 315, 433MHz |
| RKE 2 | RKE 2 | 315, 433MHz |
| ANT 1 | MIMO 1_LB/MB/HB | 617~960, 1400~3800MHz |
| ANT 2 | MIMO 2_LB/MB/HB | 617~960, 1400~3800MHz |
| ANT 3 | DSDA 1_LB/MB/HB | 617~960, 1400~3800MHz |
| ANT 4 | DSDA 2_LB/MB/HB | 617~960, 1400~3800MHz |
| ANT 5 | MIMO 1_MB/HB | 1400~3800MHz |
| ANT 6 | MIMO 2_MB/HB | 1400~3800MHz |
| BT/WiFi 1 | BT/WiFi 1 | 2.4, 5GHz |
| BT/WiFi 2 | BT/WiFi 1 | 2.4, 5GHz |

FIG. 10B

| | Freq[MHz] | S21 |
|---|---|---|
| Marker 1 | 315 | -33.37 |
| Marker 2 | 433 | -29.50 |
| Marker 3 | 617 | -25.21 |
| Marker 4 | 746 | -23.02 |
| Marker 5 | 824 | -21.94 |
| Marker 6 | 960 | -20.43 |
| Marker 7 | 1427 | -17.43 |
| Marker 8 | 1518 | -17.10 |
| Marker 9 | 1710 | -16.56 |
| Marker 10 | 1920 | -16.21 |
| Marker 11 | 2170 | -16.20 |
| Marker 12 | 2300 | -16.52 |
| Marker 13 | 2500 | -17.91 |
| Marker 14 | 2700 | -21.19 |
| Marker 15 | 2900 | -26.33 |
| Marker 16 | 3100 | -30.67 |
| Marker 17 | 3400 | -46.43 |
| Marker 18 | 3800 | -42.28 |
| Marker 19 | 5150 | -12.48 |
| Marker 20 | 5850 | -10.05 |

FIG. 11A

|  |  | S11[db] | | | | | | | | | | |
|---|---|---|---|---|---|---|---|---|---|---|---|---|
|  |  | Specs | RKE 1 | RKE 2 | ANT 1 | ANT 2 | ANT 3 | ANT 4 | ANT 5 | ANT 6 | BT/WiFi 1 | BT/WiFi 2 |
| RKE |  | -7db ↓ | -12.24 | -10.72 |  |  |  |  |  |  |  |  |
| Cellular | LOW (617~960 MHz) | -7db ↓ |  |  | -7.56 | -9.60 | -8.35 | -10.54 |  |  |  |  |
|  | MID (1.4~2.7 GHz) |  |  |  | -9.66 | -7.24 | -12.34 | -9.15 | -10.64 | -17.19 |  |  |
|  | HIGH (3.4~3.8 GHz) |  |  |  | -18.02 | -8.40 | -11.09 | -10.84 | -16.01 | -12.73 |  |  |
| BT(2.4GHz) |  | -7db ↓ |  |  |  |  |  |  |  |  | -12.65 | -12.35 |
| WiFi(5GHz) |  |  |  |  |  |  |  |  |  |  | -8.39 | -8.48 |

FIG. 11B

|  |  | 2D Avg gain(@70~90°) | | | | | | | | |
|---|---|---|---|---|---|---|---|---|---|---|
|  |  | Specs | ANT 1 | ANT 2 | ANT 3 | ANT 4 | ANT 5 | ANT 6 | BT/WiFi 1 | BT/WiFi 2 |
| RKE |  |  |  |  |  |  |  |  |  |  |
| Cellular | LOW (617~960MHz) | -2db ↑ | 0.57 | 0.64 | 0.47 | 0.59 |  |  |  |  |
|  | MID (1.4~2.7GHz) | -2db ↑ | 0.04 | 0.04 | 0.08 | 0.13 | 0.17 | 0.06 |  |  |
|  | HIGH (3.4~3.8GHz) |  | -2.31 | -2.28 | -2.58 | -2.81 | -2.28 | -2.50 |  |  |
| BT(2.4GHz) |  | -1db ↑ |  |  |  |  |  |  | 0.15 | 0.31 |
| WiFi(5GHz) |  | -3db ↑ |  |  |  |  |  |  | -0.21 | -0.47 |

FIG. 12A

|  | S11[db] | | | | | | | | | |
|---|---|---|---|---|---|---|---|---|---|---|
|  | RKE 1 | RKE 2 | ANT 1 | ANT 2 | ANT 3 | ANT 4 | ANT 5 | ANT 6 | BT/WiFi 1 | BT/WiFi 2 |
| RKE 1 |  | -17.56 | -19.07 | -11.83 | -17.74 | -18.52 | -11.91 | -13.23 | -13.43 | -11.47 |
| RKE 2 |  |  | -12.68 | -10.05 | -11.12 | -11.23 | -19.06 | -15.77 | -22.84 | -13.00 |
| ANT 1 |  |  |  | -12.95 | -17.74 | -19.51 | -11.81 | -12.52 | -11.69 | -15.58 |
| ANT 2 |  |  |  |  | -13.24 | -13.43 | -14.78 | -18.98 | -10.70 | -20.79 |
| ANT 3 |  |  |  |  |  | -20.38 | -12.16 | -15.08 | -22.84 | -15.03 |
| ANT 4 |  |  |  |  |  |  | -22.14 | -11.25 | -12.39 | -10.93 |
| ANT 5 |  |  |  |  |  |  |  | -18.87 | -20.39 | -25.49 |
| ANT 6 |  |  |  |  |  |  |  |  | -15.08 | -16.77 |
| BT/WiFi 1 |  |  |  |  |  |  |  |  |  | -12.39 |

FIG. 12B

| | Service | Frequency | CDF Spec | | CDF Result | |
|---|---|---|---|---|---|---|
| | | | P10(dBi) | P90-P10 In dB | P10(dBi) | P90-P10 In dB |
| Cellular | LTE600 | 617 | -8.0 ↑ | 7.0 ↓ | -3 ↑ | 6 ↓ |
| | LTE700 | 746 | | | | |
| | LTE800 | 824 | | | | |
| | GSM900 | 960 | -12.0 ↑ | 7.0 ↓ | | |
| | 5G1400 | 1410 | -12.0 ↑ | 7.0 ↓ | | |
| | AWS-3 | 1518 | | | | |
| | GSM1800 | 1710 | -8.0 ↑ | 7.0 ↓ | | |
| | UMTS2100 | 1920 | | | | |
| | 5G2200 | 2170 | | | | |
| | LTE2300 | 2300 | | | | |
| | UMTS2100 | 2500 | -8.0 ↑ | 8.0 ↓ | | |
| | 5G2200 | 2900 | | | | |
| | LTE2300 | 2700 | | | | |
| | LTE2300 | 3100 | | | | |
| | | 3400 | | | | |
| | | 3800 | | | | |
| BT/WiFi 2 | IS2400 | 2450 | -12 ↑ | 11 ↓ | -3 ↑ | 6 ↓ |
| | 5GHzWLAN | 5500 | -13 ↑ | 9 ↓ | | |

ANTENNA SYSTEM MOUNTED IN VEHICLE

CROSS-REFERENCE TO RELATED APPLICATIONS

This application is the National Stage filing under 35 U.S.C. 371 of International Application No. PCT/KR2020/000564, filed on Jan. 13, 2020, the contents of which are hereby incorporated by reference herein its entirety.

TECHNICAL FIELD

The present disclosure relates to an antenna system mounted in a vehicle. One particular implementation relates to an antenna system having a broadband antenna that is capable of operating in various communication systems, and to a vehicle having the same.

BACKGROUND ART

Electronic devices may be classified into mobile/portable terminals and stationary terminals according to mobility. In recent years, the electronic devices provide various services by virtue of commercialization of a wireless communication system using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange antennas having such a three-dimensional structure in an electronic device or vehicle while maintaining a low interference level among the antennas.

In addition, it is necessary to improve antenna performance while maintaining a low-profile structure in the three-dimensional antenna system. However, in the three-dimensional antenna system, a mechanical structure for fixing the antenna in a vehicle is required while securing a height of an antenna itself This may cause a problem that the antenna performance should be improved while maintaining the mechanical structure to be equal to or lower than a predetermined height.

When the antenna system is disposed in the vehicle, a plurality of antennas may be disposed. Among these antennas, an antenna operating in a low band (LB) of 600 MHz to 960 MHz has a difficulty in satisfying performance in the corresponding band. Therefore, it is necessary to design an optimal antenna that allows the antenna operating in the LB band to operate in a broad frequency band.

In addition, there is a problem in that it is difficult to implement a low-profile antenna structure in which these antennas can operate as broadband antennas even in a middle band (MB) and a high band (HB) in addition to the LB band. In addition, when such a broadband low-profile antenna is implemented with a plurality of antennas, it may be difficult to secure isolation between them.

DISCLOSURE OF INVENTION

Technical Problem

The present disclosure is directed to solving the aforementioned problems and other drawbacks. The present disclosure also describes performance improvement of an antenna system while maintaining a height of the antenna system mounted in a vehicle to be lower than or equal to a predetermined level.

The present disclosure further describes a structure for mounting an antenna system, which is capable of operating in a broad frequency band to support various communication systems, to a vehicle.

The present disclosure further describes an antenna having various structures, which can operate in a low band (LB).

The present disclosure further describes an antenna structure optimized for an antenna element to operate in a broad frequency band in addition to an LB band.

The present disclosure further describes an optimal arrangement structure capable of securing isolation characteristics between a plurality of antennas when an antenna element operates in a broad frequency band in addition to an LB band and includes the plurality of antennas.

Solution to Problem

To achieve these and other advantages and in accordance with the purpose of this specification, as embodied and broadly described herein, there is provided an antenna assembly mounted in a vehicle. The antenna system may include a circuit board disposed on a metal frame located inside a roof or roof frame of the vehicle. The antenna system may further include a first antenna connected to a first feeder of the circuit board and configured to radiate a first signal through a first metal patch disposed on a front surface and one side surface of a dielectric carrier. The antenna system may further include a second antenna connected to a second feeder of the circuit board and configured to radiate a second signal through a second metal patch disposed on a front surface and one side surface of a dielectric carrier.

In one implementation, the first antenna may be disposed in an antenna region corresponding to a central region of the circuit board, and the second antenna may be disposed in a remote keyless entry (RKE) region disposed on one side of the circuit board.

In one implementation, another side surface of the dielectric carrier of the first antenna may be disposed on the circuit board, and a rear surface of a dielectric carrier of the second antenna may be disposed on the circuit board.

In one implementation, the first antenna may include a radiation patch disposed on the front surface of the dielectric carrier, and a side surface patch. The first antenna may further include a parasitic patch disposed on a rear surface of the dielectric carrier.

In one implementation, the first antenna may be configured such that the radiation patch is implemented as a circular patch and the side surface patch is disposed on an entire region of the side surface.

In one implementation, the circular patch may have a diameter that is the same as a length of the side surface patch.

In one implementation, the first antenna may be configured such that the radiation patch is implemented as a square patch and the side surface patch is disposed on an entire region of the side surface.

In one implementation, a length of the square patch at a point connected to the side surface patch may be shorter than a length of the side surface patch.

In one implementation, the antenna system may further include a third antenna connected to a third feeder of the circuit board and configured to radiate a third signal through a third metal patch disposed on a front surface and one side surface of a dielectric carrier. The antenna system may further include a fourth antenna connected to a fourth feeder of the circuit board and configured to radiate a fourth signal through a fourth metal patch disposed on a front surface and one side surface of a dielectric carrier.

In one implementation, the third antenna may be disposed in an antenna region corresponding to a central region of the circuit board. The fourth antenna may be disposed in a remote keyless entry (RKE) region disposed on another side of the circuit board.

In one implementation, the antenna system may further include a fifth antenna connected to a fifth feeder of the circuit board and configured to radiate a fifth signal through a fifth metal patch disposed on a front surface and one side surface of a dielectric carrier The antenna system may further include a sixth antenna connected to a sixth feeder of the circuit board and configured to radiate a sixth signal through a sixth metal patch disposed on a front surface and one side surface of a dielectric carrier.

In one implementation, the fifth antenna and the sixth antenna may be disposed in an antenna region corresponding to the central region of the circuit board.

In one implementation, the antenna system may further include a transceiver circuit disposed on the circuit board and configured to control a signal to be radiated through at least one of the first antenna and the second antenna.

In one implementation, the antenna system may further include a baseband processor connected to the transceiver circuit and configured to perform multi-input/multi-output (MIMO) by radiating the first and second signals through the first antenna and the second antenna.

In one implementation, the first antenna may be disposed on one side of the antenna region and the third antenna may be disposed on another side of the antenna region. The fifth antenna may be disposed below the antenna region and the sixth antenna may be disposed above the antenna region.

In one implementation, the fifth antenna may be disposed at an angle rotated by 90 degrees with respect to the first antenna. The sixth antenna may be disposed at an angle rotated by 90 degrees with respect to the third antenna.

In one implementation, the second antenna may be disposed in a first remote keyless entry (RKE) region disposed on one side of the circuit board. The fourth antenna may be disposed in a RKE region disposed on another side of the circuit board.

In one implementation, the first antenna, the third antenna, the fifth antenna, and the sixth antenna may be disposed perpendicular to the circuit board.

In one implementation, the second antenna and the fourth antenna may be disposed parallel to the circuit board so that signals are radiated to the front through the radiation patches on the front surface of the dielectric carrier.

In one implementation, the first antenna and the third antenna may be disposed in a symmetric form with respect to a center of the circuit board in left and right directions. The fifth antenna and the sixth antenna may be disposed in a symmetric form with respect to the center of the circuit board in up and down directions.

In one implementation, the second antenna may be disposed on a lower left portion of a first KRE region located on one side of the circuit board, and a first RKE antenna may be disposed on an upper left portion of the first RKE region.

In one implementation, the fourth antenna may be disposed on an upper right portion of a second KRE region located on another side of the circuit board, and a second RKE antenna may be disposed on a lower right portion of the second RKE region.

In one implementation, the radiation patches of the second antenna and the fourth antenna may be implemented as circular patches, and the side surface patches thereof disposed on the dielectric carrier may be disposed on an entire region of the side surface. The circular patch may have a diameter that is the same as a length of the side surface patch.

In one implementation, the baseband processor may be configured to control the transceiver circuit to perform 4×4 MIMO through the first antenna, the second antenna, the fifth antenna, and the sixth antenna.

In one implementation, the baseband processor may be configured to control the transceiver circuit to perform 2×2 dual sim dual active (DSDA) through the third antenna and the fourth antenna.

In one implementation, the first to fourth antennas may be configured to operate in a low band (LB) corresponding to 617 MHz to 960 MHz, and a middle band (MB) and a high band (HB) corresponding to 1400 MHz to 3800 MHz. The fifth antenna and the sixth antenna may be configured to operate in the middle band (MB) and the high band (HB).

In one implementation, the baseband processor may perform 2×2 MIMO through the first antenna and the second antenna in the low band (LB).

In one implementation, the baseband processor may perform 4×4 MIMO through the first antenna, the second antenna, the fifth antenna, and the sixth antenna in the middle band (MB) and the high band (HB).

According to another aspect of the subject matter disclosed herein, there is provided a vehicle having an antenna assembly. The vehicle may include an antenna system that includes a circuit board disposed on a metal frame located inside a roof or roof frame of the vehicle, a first antenna connected to a first feeder of the circuit board and configured to radiate a first signal through a first metal patch disposed on a front surface and one side surface of a dielectric carrier, and a second antenna connected to a second feeder of the circuit board and configured to radiate a second signal through a second metal patch disposed on a front surface and one side surface of a dielectric carrier.

In one implementation, the vehicle may further include a transceiver circuit configured to control a signal to be radiated through at least one of the first antenna and the second antenna.

In one implementation, the vehicle may further include a baseband processor configured to communicate with at least one of an adjacent vehicle, a Road Side Unit (RSU) and a base station through the transceiver circuit.

Advantageous Effects of Invention

Hereinafter, technical effects of an antenna system mounted on a vehicle and a vehicle equipped with the antenna system will be described.

According to an implementation, antenna performance of an antenna system mounted in a vehicle can be improved while maintaining a height of the antenna system to be a predetermined level or lower.

According to an implementation, a structure for mounting an antenna system, which can operate in a broad frequency band, to a vehicle can be provided to support various communication systems by implementing a low band (LB) antenna and other antennas in one antenna module.

According an implementation, various structures of planar antennas which can operate in a broad frequency band can be provided by using a parasitic patch and a radiation patch implemented on a carrier.

According to an implementation, an antenna system can be optimized with different antennas in a low band and other bands. This can result in arranging the antenna system with optimal configuration and performance in a roof frame of a vehicle.

According to the present disclosure, an antenna system of a vehicle can implement MIMO and diversity operations using a plurality of antennas in specific bands.

According to an implementation, antennas that are printed on a dielectric carrier can be implemented in an optimal arrangement structure to operate in a broad frequency band, thereby improving antenna efficiency and secure isolation between the antennas.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

BRIEF DESCRIPTION OF DRAWINGS

FIG. 7C is a view illustrating functions and operating frequency bands of the plurality of antennas of FIG. 7A.

FIG. 10B is a view illustrating an isolation characteristic between an RKE antenna and a second antenna for each corresponding frequency.

FIG. 11A is a view illustrating reflection coefficients for a plurality of antennas in units of dB. FIG. 11B is a view illustrating gain characteristics for the plurality of antennas.

FIG. 12A is a view illustrating isolation characteristics among a plurality of antennas.

FIG. 12B is a view illustrating Cumulative Density Function (CDF) characteristics in a cellular band and a Bluetooth/WiFi band.

MODE FOR THE INVENTION

Figure 1A:
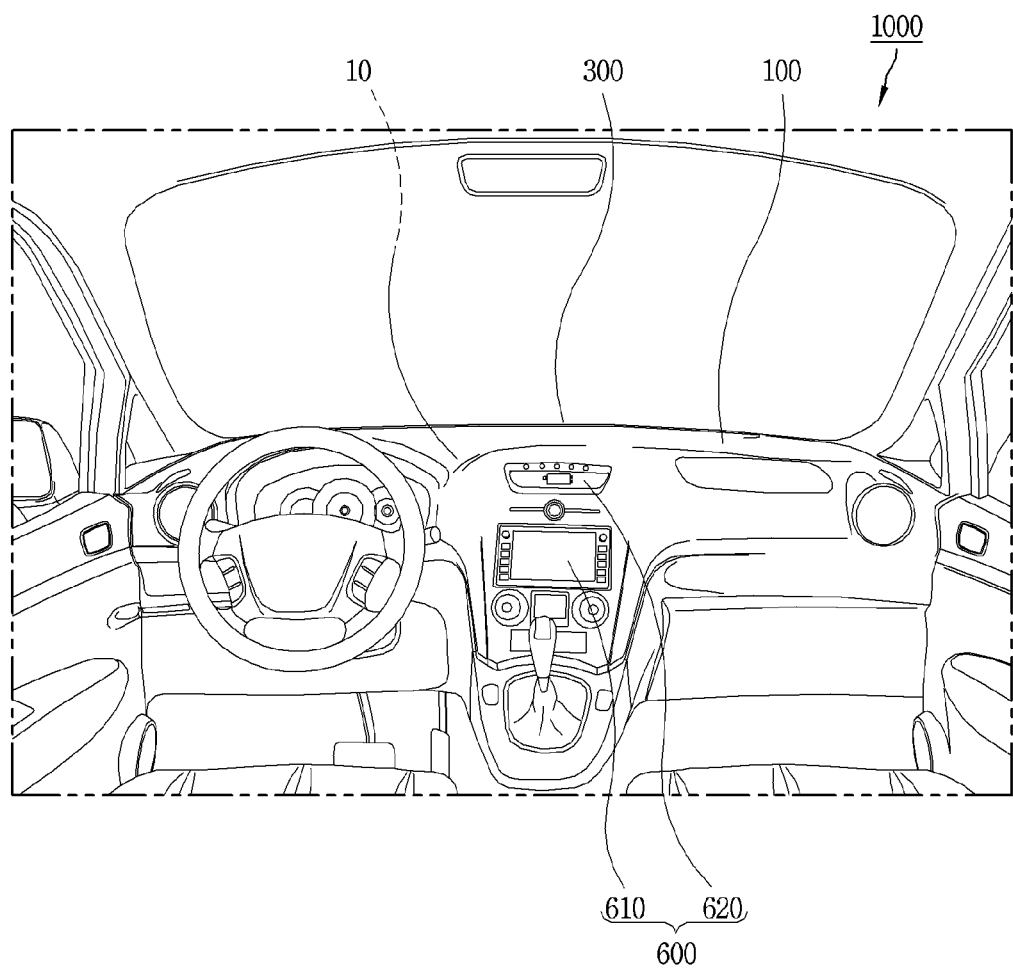
FIG. 1A is a diagram illustrating a vehicle interior in accordance with one example.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

An electronic device described herein may include a vehicle in addition to a mobile terminal. Therefore, wireless communication through the electronic device described herein may include wireless communication through the vehicle in addition to wireless communication through the mobile terminal.

Configuration and operations according to implementations described herein may also be applied to the vehicle in addition to the mobile terminal. Configurations and operations according to implementations may also be applied to a communication system, namely, antenna system mounted on the vehicle. In this regard, the antenna system mounted on the vehicle may include a plurality of antennas, and a transceiver circuit and a processor for controlling the plurality of antennas.

On the other hand, an antenna system mounted on a vehicle disclosed in this specification mainly refers to an antenna system disposed on an outside of the vehicle, but may also include a mobile terminal (electronic device) belonging to a user aboard the vehicle.

Figure 1B:
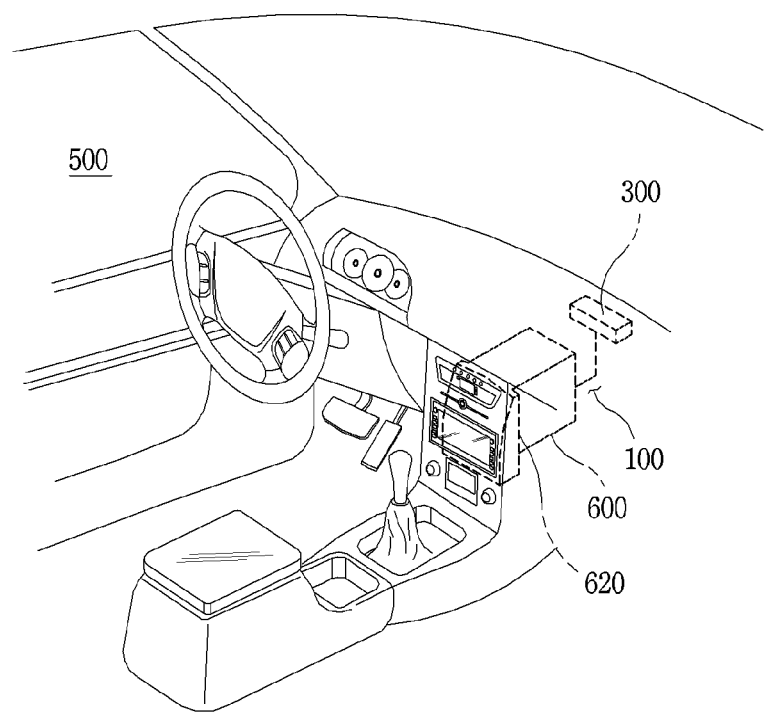
FIG. 1B is a diagram illustrating the vehicle interior in accordance with the one example, viewed from a side.

FIG. 1A is a diagram illustrating a vehicle interior in accordance with one example. FIG. 1B is a diagram illustrating the vehicle interior in accordance with the one example, viewed from a side.

As illustrated in FIGS. 1A and 1B, the present disclosure describes an antenna unit (i.e., an internal antenna system) 300 capable of transmitting and receiving signals through GPS, 4G wireless communication, 5G wireless communication, Bluetooth, or wireless LAN. Therefore, the antenna unit (i.e., the internal antenna system) 300 capable of supporting these various communication protocols may be referred to as an integrated antenna module 300.

The present disclosure also describes a vehicle 500 having the antenna unit (i.e., the internal antenna system) 300. The vehicle 500 may include a housing including a dashboard 100 and an antenna unit 300. In addition, the vehicle 500 may include a mounting bracket for mounting the antenna unit 300.

The vehicle 500 according to the present disclosure may include an antenna module 300 corresponding to an antenna unit (i.e., an internal antenna system) and a telematics module (TCU) 600 configured to be connected to the antenna module 300. In one example, the telematics module 600 may be configured to include the antenna module 300. The telematics module 600 may include a display 610 and an audio unit 620.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may indicate the same meaning as V2X sidelink or NR V2X or may indicate a broader meaning including V2X sidelink or NR V2X.

V2X communication can be applied to various services, for example, forward collision warning, automatic parking system, Cooperative Adaptive Cruise Control (CACC), control loss warning, traffic queue warning, traffic vulnerable safety warning, emergency vehicle warning, speed warning when driving on a curved road, traffic flow control, and the like.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU is also a stationary infrastructure entity supporting V2X application programs, and can exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an eNB (referred to as an eNB-type RSU) or a UE (referred to as a UE-type RSU).

V2I Service is a type of V2X service, where one party is a vehicle whereas the other party is an entity belonging to infrastructure. V2P Service is also a type of V2X service, where one party is a vehicle and the other party is a device carried by an individual (e.g., a handheld terminal carried by a pedestrian, a cyclist, a driver, or a passenger). V2X Service is a type of 3GPP communication service that involves a transmitting or receiving device on a vehicle. Based on the other party involved in the communication, it may be further divided into V2V service, V2I service and V2P service.

V2X enabled UE is a UE that supports V2X service. V2V Service is a type of V2X service, where both parties of communication are vehicles. V2V communication range is a direct communication range between two vehicles engaged in V2V service.

Figure 2A:
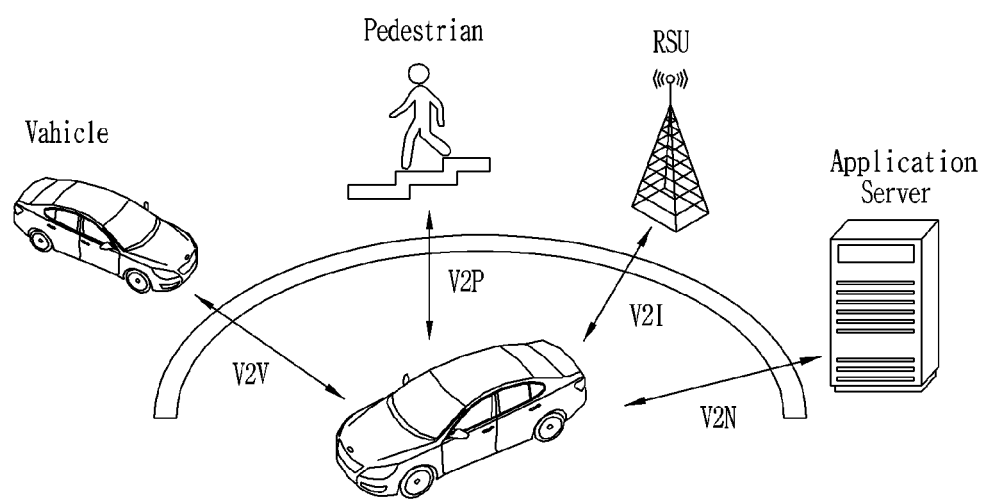
FIG. 2A is a diagram illustrating a type of V2X application.

V2X applications, referred to as Vehicle-to-Everything (V2X), include the four different types, as described above, namely, (1) vehicle-to-vehicle (V2V), (2) vehicle-to-infrastructure (V2I), (3) vehicle-to-network (V2N), (4) vehicle-to-pedestrian (V2P). FIG. 2A illustrates a type of V2X application. Referring to FIG. 2A, the four types of V2X applications may use "cooperative awareness" to provide more intelligent services for end-users.

This means that entities, such as vehicles, roadside infrastructures, application servers and pedestrians, may collect knowledge of their local environments (e.g., information received from other vehicles or sensor equipment in proximity) to process and share that knowledge in order to provide more intelligent services, such as cooperative collision warning or autonomous driving.

<NR V2X>

Support for V2V and V2X services has been introduced in LTE during Releases 14 and 15, in order to expand the 3GPP platform to the automotive industry.

Requirements for support of enhanced V2X use cases are broadly arranged into four use case groups.

(1) Vehicles Platooning enables the vehicles to dynamically form a platoon traveling together. All the vehicles in the platoon obtain information from the leading vehicle to manage this platoon. These types of information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicles can increase the perception of their environment beyond of what their own sensors can detect and have a more broad and holistic view of the local situation. High data rate is one of the key characteristics.

(3) Advanced Driving enables semi-automated or full-automated driving. Each vehicle and/or RSU shares its own perception data obtained from its local sensors with vehicles in proximity and allows vehicles to synchronize and coordinate their trajectories or maneuvers. Each vehicle shares its driving intention with vehicles in proximity too.

(4) Remote Driving enables a remote driver or a V2X application to operate a remote vehicle for those passengers who cannot drive by themselves or remote vehicles located in dangerous environments. For a case where variation is limited and routes are predictable, such as in public transportation, driving based on cloud computing can be used. High reliability and low latency are the main requirements.

A description to be given below can be applied to all of NR SL (sidelink) and LTE SL, and when no radio access technology (RAT) is indicated, the NR SL is meant. Operation scenarios considered in NR V2X may be categorized into six as follows. In this regard, FIG. 2B illustrates a standalone scenario supporting V2X SL communication and an MR-DC scenario supporting V2X SL communication.

In particular, 1) in scenario 1, a gNB provides control/configuration for a UE's V2X communication in both LTE SL and NR SL. 2) In scenario 2, an ng-eNB provides control/configuration for a UE's V2X communication in both LTE SL and NR SL. 3) In scenario 3, an eNB provides control/configuration for a UE's V2X communication in both LTE SL and NR SL. On the other hand, 4) in scenario 4, a UE's V2X communication in LTE SL and NR SL is controlled/configured by Uu while the UE is configured with EN-DC. 5) In scenario 5, a UE's V2X communication in LTE SL and NR SL is controlled/configured by Uu while the UE is configured in NE-DC. 6) In scenario 6, a UE's V2X communication in LTE SL and NR SL is controlled/configured by Uu while the UE is configured in NGEN-DC.

Figure 2B:
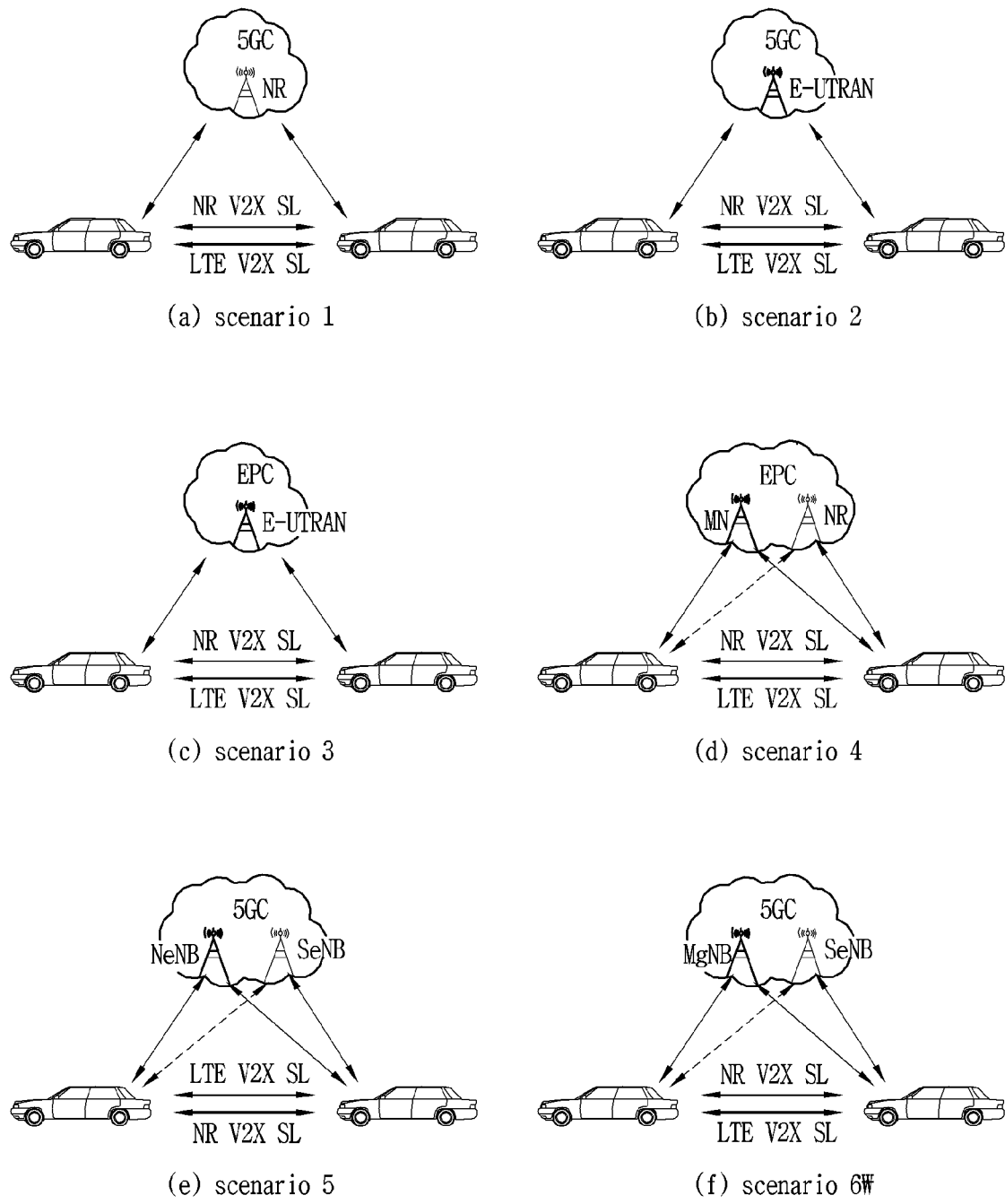
FIG. 2B illustrates a standalone scenario supporting V2X SL communication and an MR-DC scenario supporting V2X SL communication.

In order to support V2X communication, as illustrated in FIGS. 2A and 2B, a vehicle may perform wireless communication with an eNB and/or a gNB through an antenna system.

Figure 3A:
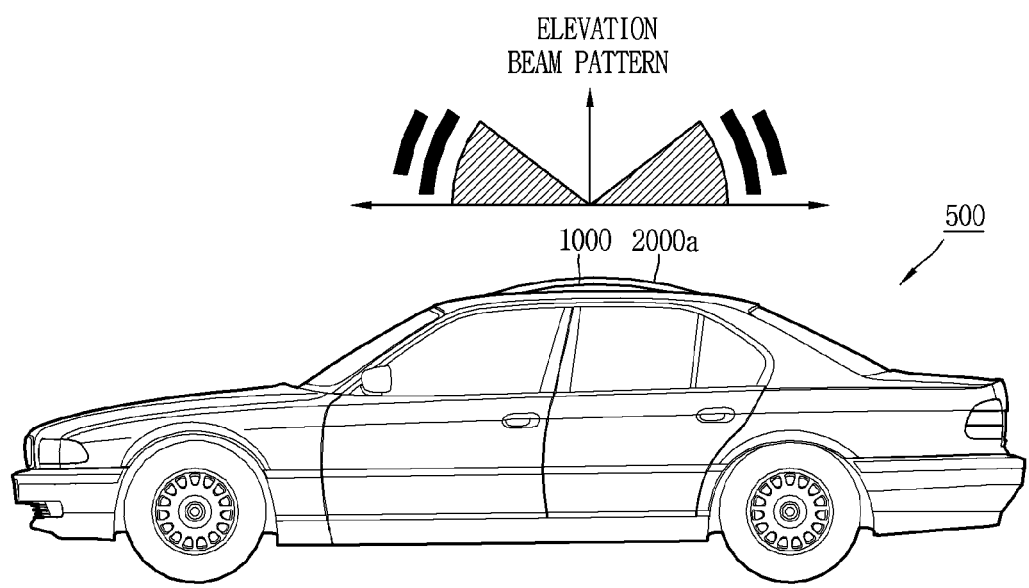
FIGS. 3A to 3C are views illustrating an example of a structure for mounting an antenna system in a vehicle, which includes the antenna system mounted in the vehicle.
Figure 3B:
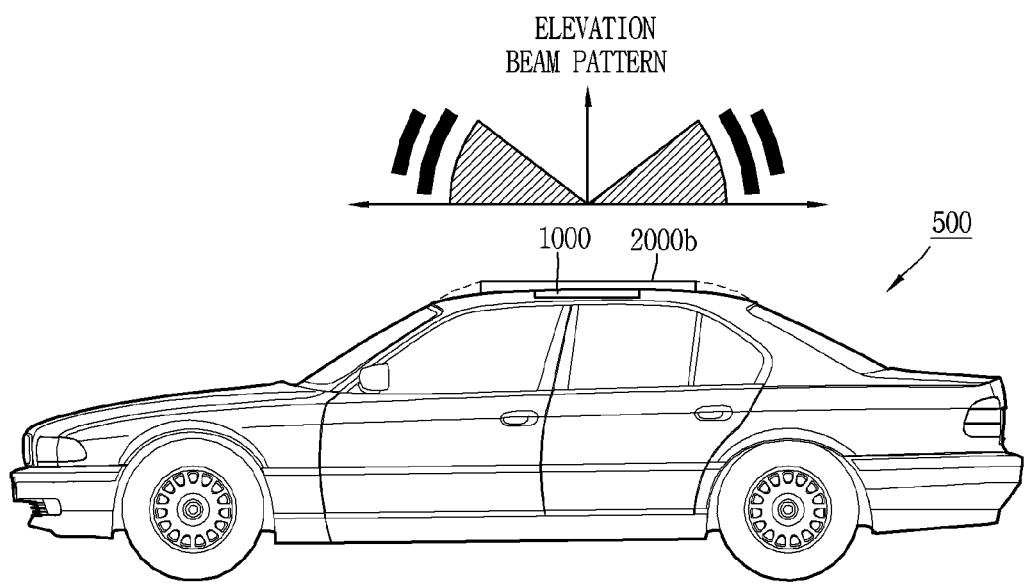
Figure 3C:
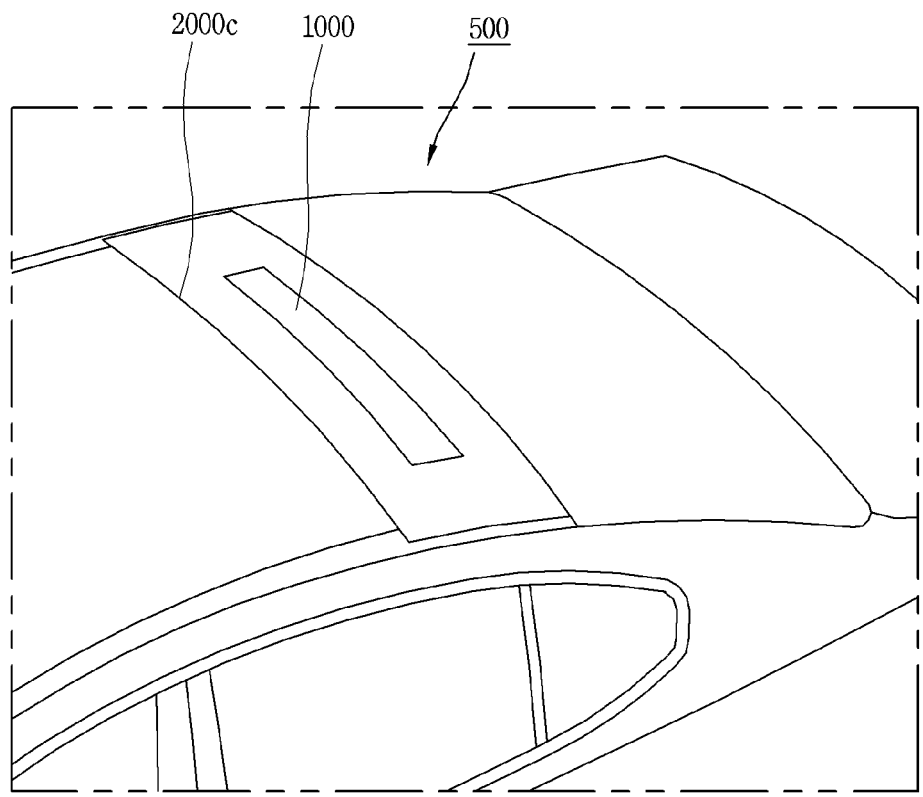

FIGS. 3A to 3C are views illustrating an example of a structure for mounting an antenna system in a vehicle, which includes the antenna system mounted in the vehicle. In this regard, FIGS. 3A and 3B illustrate a configuration in which an antenna system 1000 is mounted on or in a roof of a vehicle. Meanwhile, FIG. 3C illustrates a structure in which the antenna system 1000 is mounted on a roof of the vehicle and a roof frame of a rear mirror.

Referring to FIGS. 3A to 3C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 may be disposed on the roof of the vehicle. In FIG. 3A, a radome 2000a for protecting the antenna system 1000 from an external environment and external impacts while the vehicle travels may cover the antenna system 1000. The radome 2000a may be made of a dielectric material through which radio signals are transmitted/received between the antenna system 1000 and a base station.

Referring to FIG. 3B, the antenna system 1000 may be disposed within a roof structure 2000b of the vehicle, and at least part of the roof structure 2000b may be made of a non-metallic material. At this time, the at least part of the roof structure 2000b of the vehicle may be realized as the non-metallic material, and may be made of a dielectric material through which radio signals are transmitted/received between the antenna system 1000 and the base station.

Also, referring to 3C, the antenna system 1000 may be disposed within a roof frame 2000c of the vehicle, and at least part of the roof frame 200c may be made of a non-metallic material. At this time, the at least part of the roof frame 2000c of the vehicle 500 may be realized as the non-metallic material, and may be made of a dielectric material through which radio signals are transmitted/received between the antenna system 1000 and the base station.

Meanwhile, referring to FIGS. 3A to 3C, a beam pattern by an antenna disposed in the antenna system 1000 mounted on the vehicle needs to be formed at an upper side by a predetermined angle in a horizontal region.

In this regard, the peak of an elevation beam pattern of the antenna disposed in the antenna system 1000 does not need to be formed at a bore site. Accordingly, the peak of the elevation beam pattern of the antenna needs to be formed at an upper side by a predetermined angle in the horizontal region. For example, the elevation beam pattern of the antenna may be formed in a hemispheric shape as illustrated in FIGS. 2A to 2C.

As aforementioned, the antenna system 1000 may be installed on the front or rear surface of the vehicle depending on applications, other than the roof structure or roof frame of the vehicle. In this regard, the antenna system 1000 may correspond to an external antenna.

Meanwhile, the vehicle 500 may include only an antenna unit (i.e., internal antenna system) 300 corresponding to an internal antenna without an antenna system 1000 corresponding to an external antenna. In addition, the vehicle 500 may include both the antenna system 1000 corresponding to the external antenna and the antenna unit (i.e., the internal antenna system) 300 corresponding to the internal antenna.

Figure 4A:
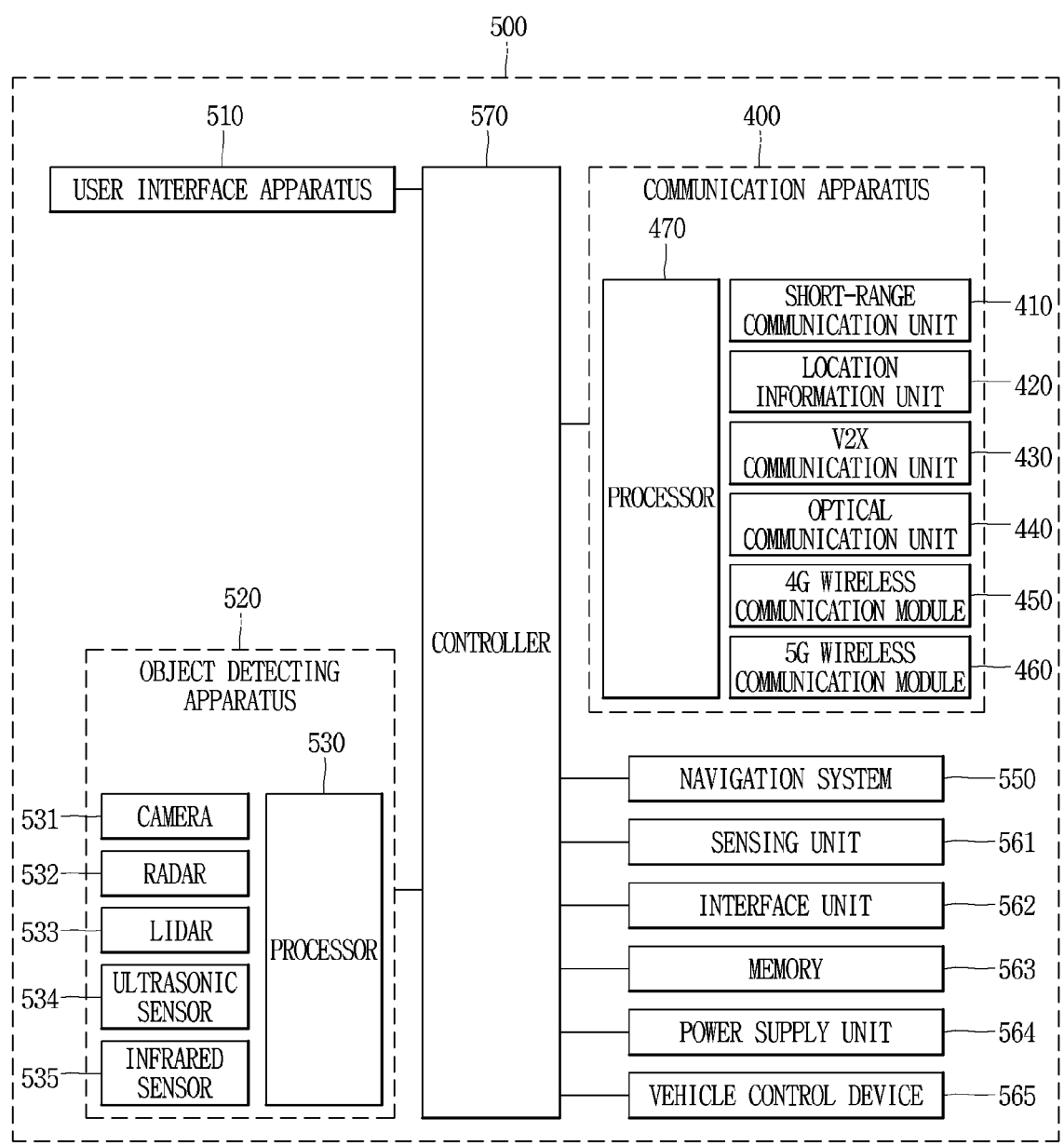
FIG. 4A is a block diagram illustrating a vehicle and an antenna system mounted to the vehicle in accordance with one implementation.

FIG. 4 is a block diagram illustrating a vehicle and an antenna system mounted on the vehicle in accordance with an implementation.

The vehicle 500 may be an autonomous vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics module mounted on the vehicle 500. Specifically, the telematics module mounted on the vehicle 500 may perform the operations in cooperation with the antenna module 300, the object detecting apparatus 520, and other interfaces. In some examples, the communication apparatus 400 may be disposed in the telematics module separately from the antenna system 300 or may be disposed in the antenna system 300.

The vehicle 500 may be switched into the autonomous driving mode or the manual mode based on driving environment information. The driving environment information may be generated based on object information provided from the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided from an external device.

When the vehicle 500 is driven in the autonomous driving mode, the autonomous vehicle 500 may be driven based on an operation system. For example, the autonomous vehicle 500 may be driven based on information, data or signal generated in a driving system, a parking exit system, and a parking system. When the vehicle 500 is driven in the manual mode, the autonomous vehicle 500 may receive a user input for driving through a driving control apparatus. The vehicle 500 may be driven based on the user input received through the driving control apparatus.

The vehicle 500 may include a user interface apparatus 510, an object detecting apparatus 520, a navigation system 550, and a communication apparatus 400. In addition, the vehicle may further include a sensing unit 561, an interface unit 562, a memory 563, a power supply unit 564, and a vehicle control device 565 in addition to the aforementioned apparatuses and devices. In some implementations, the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 510 may implement user interfaces (UIs) or user experiences (UXs) through the user interface apparatus 200.

The object detecting apparatus 520 may be an apparatus for detecting an object located at outside of the vehicle 500. The object may be a variety of objects associated with driving (operation) of the vehicle 500. In some examples, objects may be classified into moving objects and fixed (stationary) objects. For example, the moving objects may include other vehicles and pedestrians. The fixed objects may include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as a calculation of a distance from the object, a calculation of a relative speed with the object and the like, through an image processing algorithm.

In some implementations, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a broadcast transceiver 450 and a processor 470. According to an implementation, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 is a unit for performing wireless communication with a server (Vehicle to Infra; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P. The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal. In some implementations, the light-emitting diode may be integrated with lamps provided on the vehicle 500.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) structure. The 4G base station and the 5G base station may be disposed in the Non-Stand-Alone (NSA) structure. Alternatively, the 5G base station may be disposed in a Stand-Alone (SA) structure at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, 5G and 4G networks may use the same frequency band, and this may be referred to as LTE re-farming. In some examples, a Sub 6 frequency band, which is a range of 6 GHz or less, may be used as the 5G frequency band. On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity with the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460. Short-range communication between electronic devices (e.g., vehicles) may be performed using the 4G wireless communication module 450 and the 5G wireless communication module 460. In some implementations, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi CA may be performed using the 4G wireless communication module 450 and the Wi-Fi communication module. Or, 5G+WiFi CA may be performed using the 5G wireless communication module 460 and the Wi-Fi communication module 113.

Meanwhile, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

Figure 4B:
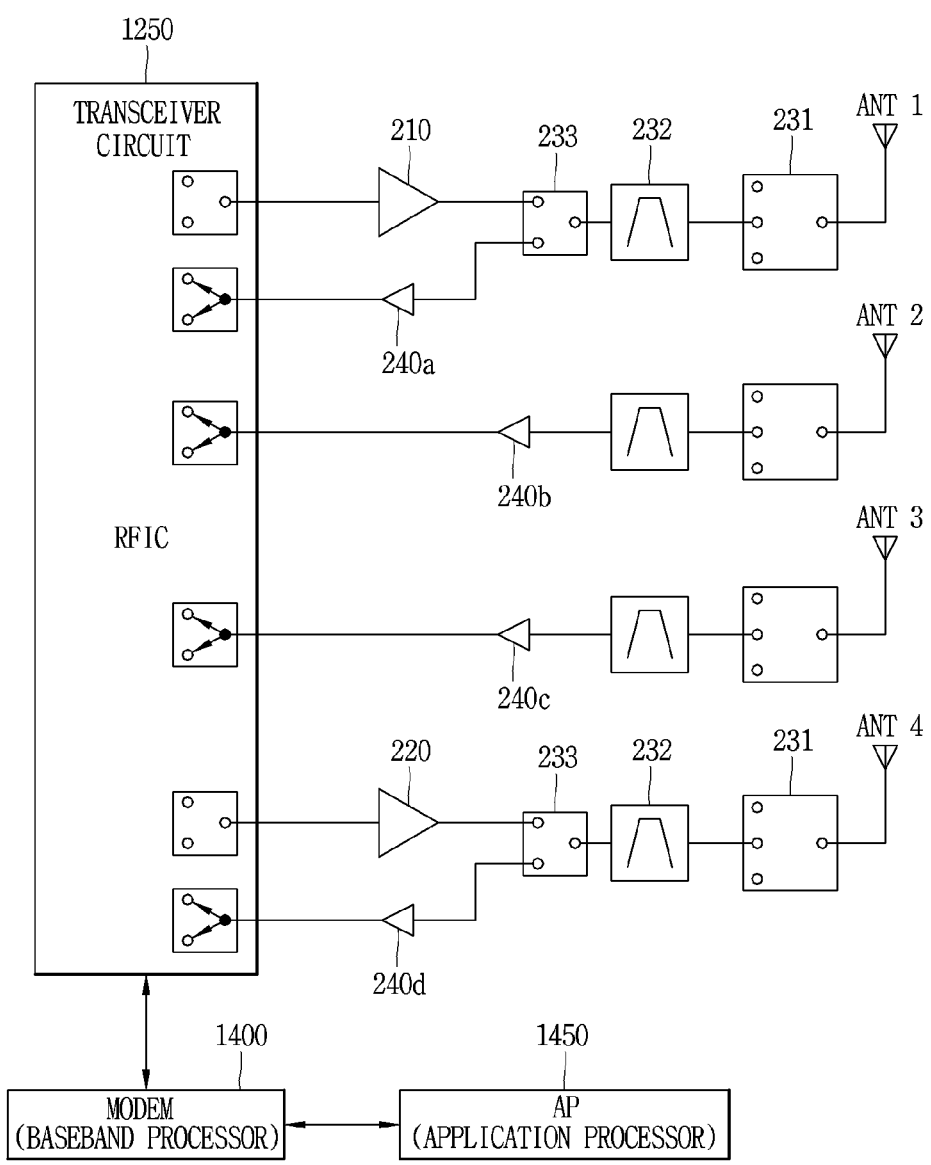
FIG. 4B is a block diagram illustrating an exemplary configuration of a wireless communication unit of a vehicle that can operate in a plurality of wireless communication systems.

FIG. 4B is a block diagram illustrating an exemplary configuration of a wireless communication unit of a vehicle that can operate in a plurality of wireless communication systems. Referring to FIG. 4B, the vehicle may include a first power amplifier 210, a second power amplifier 220, and an RFIC 1250. In addition, the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the vehicle may include a plurality of low noise amplifiers (LNAs) 210a to 240a in the receiver. Here, the first power amplifier 210, the second power amplifier 220, the RFIC 1250, and the plurality of low noise amplifiers 210a to 40a may all be operable in the first communication system and the second communication system. In this case, the first communication system and the second communication system may be a 4G communication system and a 5G communication system, respectively.

As illustrated in FIG. 4, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. Meanwhile, even when the RFIC 1250 is configured as the 4G/5G separate type, the 4G RFIC and the 5G RFIC may be logically and functionally separated but physically implemented in one chip as SoC (System on Chip). On the other hand, the application processor (AP) 1450 may be configured to control the operation of each component of the electronic device. Specifically, the application processor (AP) 1450 may control the operation of each component of the electronic device through the modem 1400.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems. On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mmWave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band. Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL).

In addition, the vehicle that is operable in the plurality of wireless communication systems according to an implementation may further include a duplexer 231, a filter 232, and a switch 233. The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 210a and 240a through a second output port of the duplexer 231. The filter 232 may be configured to pass a signal in a transmission band or a reception band and to block a signal in a remaining band. The switch 233 may be configured to transmit only one of a transmission signal and a reception signal.

Meanwhile, the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit. The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities through the allocated resources.

Figure 5A:
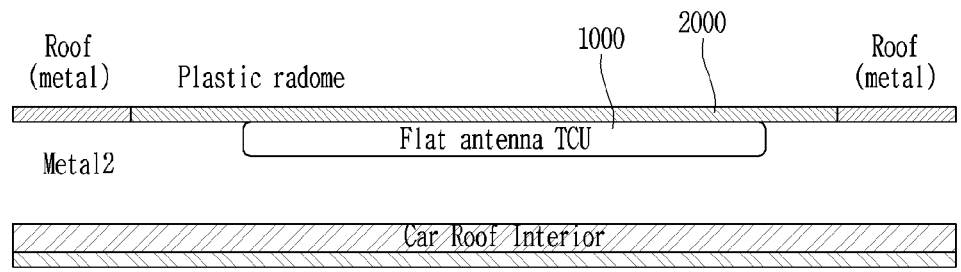
FIG. 5A is a view illustrating an arrangement structure of an antenna system in accordance with one implementation.

Meanwhile, referring to FIGS. 1A to 4B, the antenna system mounted on the vehicle may be disposed on the roof of the vehicle, inside the roof, or inside the roof frame. FIG. 5A is a view illustrating an arrangement structure of an antenna system in accordance with one implementation. And, FIG. 5B is a view illustrating an internal structure in a height direction of the antenna system including a plurality of antennas in the structure of FIG. 5A.

Figure 5B:
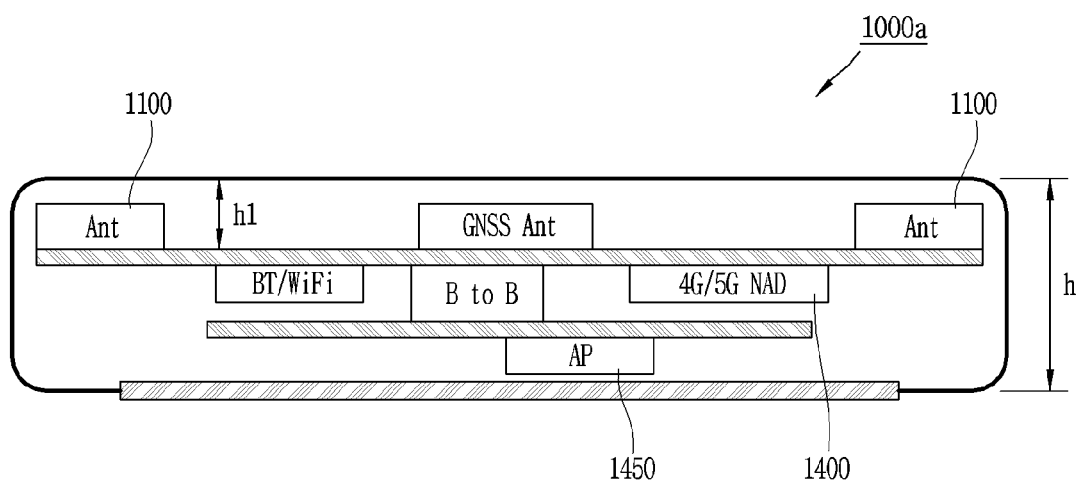
FIG. 5B is a view illustrating an internal structure in a height direction of the antenna system including a plurality of antennas in the structure of FIG. 5A.

As illustrated in FIGS. 5A and 5B, the antenna system 1000 may be disposed inside the radome 2000. Meanwhile, a vehicle roof made of a metal or an internal structure of the vehicle roof may be disposed beneath the antenna system 1000. That is, the TCU having a flat antenna structure may be directly mounted on a plastic cover of the vehicle roof In this regard, a plurality of antennas 1100 may be disposed on an upper portion of a circuit board, and a 4G/5G network access device (NAD) 1400 may be disposed on a lower portion of the circuit board. Also, an application processor (AP) 1450 may be disposed on a lower portion of another circuit board. In this structure, the height of the plurality of antennas 1100 may be limited to h1 in the antenna system 1000a having an overall height h.

Figure 6A:
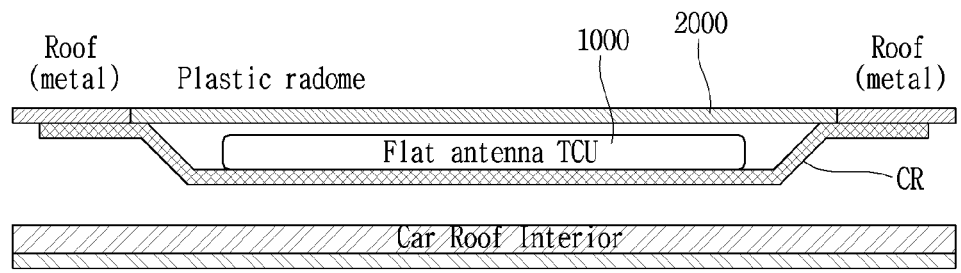
FIG. 6A is a view illustrating an arrangement structure of an antenna system in accordance with another implementation.

On the other hand, FIG. 6A is a view illustrating an arrangement structure of an antenna system in accordance with another implementation. And, FIG. 6B is a view illustrating an internal structure in a height direction of the antenna system including a plurality of antennas in the structure of FIG. 6A.

Figure 6B:
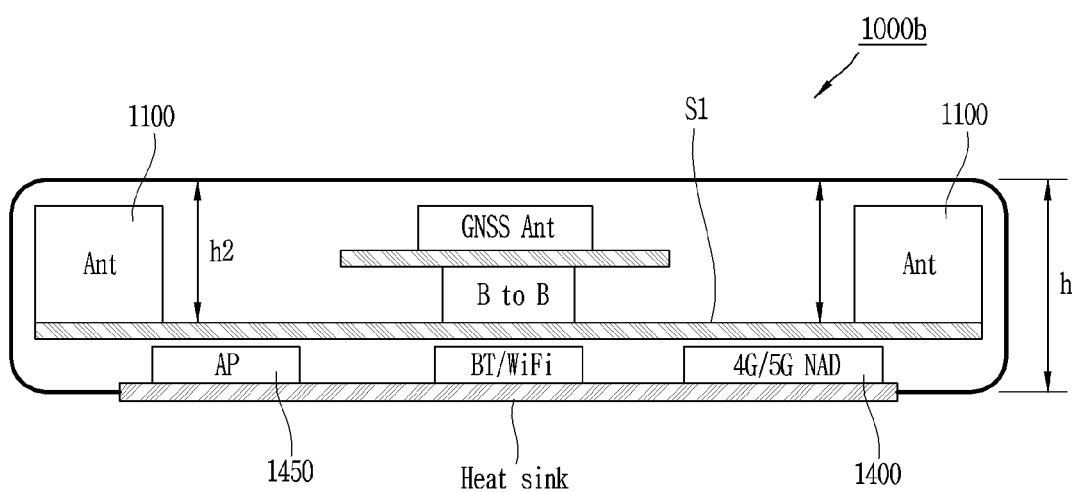
FIG. 6B is a view illustrating an internal structure in a height direction of the antenna system including a plurality of antennas in the structure of FIG. 6A.

As illustrated in FIGS. 6A and 6B, the antenna system 1000 may be disposed inside the radome 2000. A metal cradle CR made of a metal may be disposed beneath the antenna system 1000. The metal cradle CR may be connected to the vehicle roof. Accordingly, heat generated in the antenna system 1000 may be emitted to the outside through the metal cradle CR. In this structure, a TCU having a flat antenna structure may be mounted on the metal cradle CR under the vehicle roof. In this case, a plurality of antennas 1100 may be disposed on an upper portion of a circuit board, and a 4G/5G network access device (NAD) 1400 and an application processor (AP) 1450 may be disposed on a heat sink.

In this structure, the height of the plurality of antennas 1100 may extend up to h2 in the antenna system 1000b having an overall height h. Accordingly, the plurality of antennas 1100 can have the extended height h2 in the structure of FIG. 6B, as compared to the structure of FIG. 5B with the limited height h1. For example, when the overall height h of the antenna system of FIG. 5B is 25 mm, the height h1 of the plurality of antennas 1100 may be limited to 5 to 7 mm. On the other hand, when the overall height h of the antenna system of FIG. 6B is 25 mm, the height h2 of the plurality of antennas 1100 may be limited to 16 to 18 mm.

Hereinafter, structural/technical characteristics and measurement method of a first type flat antenna of FIGS. 5A and 5B and a second type flat antenna of FIGS. 6A and 6B will be described. The first type antenna may perform a pattern design and matching operation for optimizing antenna performance on the basis of an open space. In this regard, an antenna radiation pattern may be measured after installing the first type antenna in a central portion of a metal plate with a predetermined diameter in a state where a metal is not present around the antenna. It may be aimed at securing a radiation pattern similar to a spherical shape with respect to the first type antenna. In this case, the antenna can be designed to acquire an optimal antenna gain in the range of 60 to 70 degrees of elevation.

On the other hand, the second type antenna can obtain optimized antenna performance by antenna pattern designing and matching under the assumption that the antenna system 1000 is fastened to a metal structure. In this regard, the antenna radiation pattern may be measured by manufacturing a metal cradle mounted on a vehicle. In this case, the antenna system 1000 including the metal cradle may be configured to secure a spherical radiation pattern so as to have a more improved reception performance at a low elevation angle.

The radiation pattern of the second type antenna may be referred to as a hemi-spherical radiation pattern. On the other hand, the radiation pattern of the first type antenna may be referred to as an omni-directional radiation pattern. Therefore, the radiation pattern of the second type antenna can be applied to a new antenna structure and method to secure an optimal antenna gain at an elevation angle of about 70 to 90 degrees.

It will be clearly understood by those skilled in the art that various changes and modifications to the aforementioned implementations related to the antenna system are made without departing from the idea and scope of the present disclosure. Therefore, it should be understood that such various changes and modifications to the implementations fall within the scope of the appended claims.

Hereinafter, an antenna system including a plurality of antennas according to an implementation will be described. The present disclosure also describes performance improvement of an antenna system while maintaining a height of the antenna system mounted in a vehicle to be lower than or equal to a predetermined level. The present disclosure further describes a structure for mounting an antenna system, which is capable of operating in a broad frequency band to support various communication systems, to a vehicle. The present disclosure further describes an antenna having various structures, which can operate in a low band (LB). The present disclosure further describes an antenna structure optimized for an antenna element to operate in a broad frequency band in addition to an LB band. The present disclosure further describes an optimal arrangement structure capable of securing isolation characteristics between a plurality of antennas when an antenna element operates in a broad frequency band in addition to an LB band and includes the plurality of antennas.

Figure 7A:
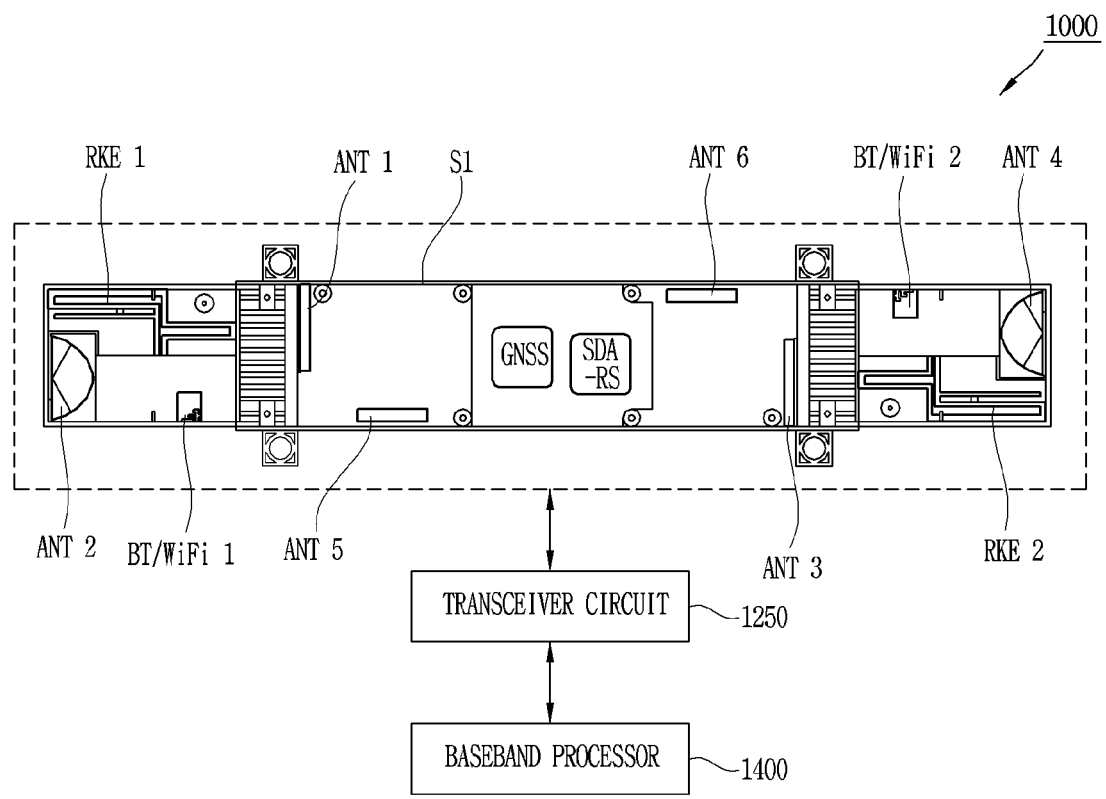
FIG. 7A is a view illustrating the configuration of controlling a circuit board on which a plurality of antennas are disposed and the antennas in accordance with one implementation.
Figure 7B:
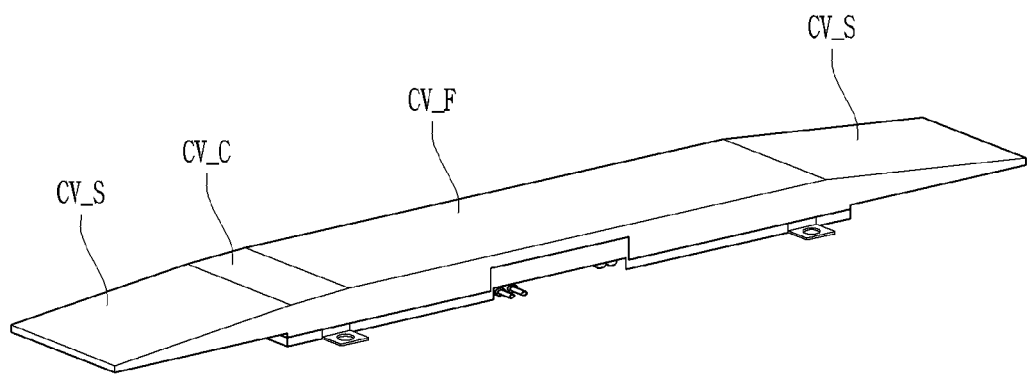
FIG. 7B is a view illustrating a configuration in which an antenna system including the plurality of antennas is coupled to an external structure.

In this regard, FIG. 7A is a view illustrating the configuration of controlling a circuit board on which a plurality of antennas are disposed and the antennas in accordance with one implementation. FIG. 7B is a view illustrating a configuration in which an antenna system including the plurality of antennas is coupled to an external structure. FIG. 7C is a view illustrating functions and operating frequency bands of the plurality of antennas of FIG. 7A.

Referring to FIGS. 6 to 7C, the antenna system 1000 may include a circuit board S1 and a plurality of antennas 1100. Here, the circuit board S1 may be disposed to be spaced apart by a predetermined distance from a metal frame, which is disposed inside the roof or roof frame of the vehicle. In this case, the metal frame may correspond to a lower end of the antenna system 1000 and may be implemented as a heat sink.

Figure 8A:
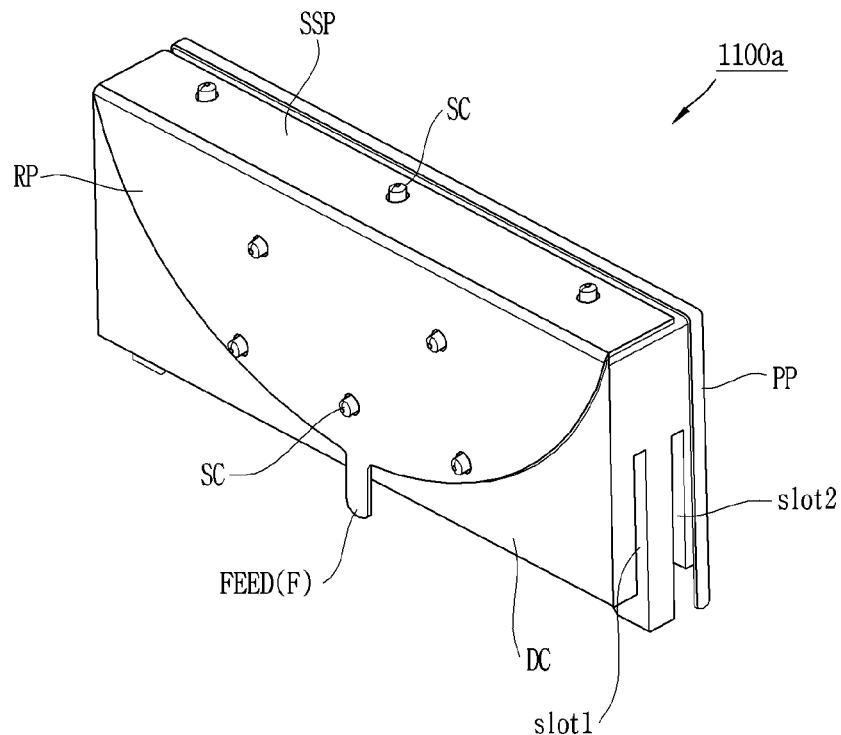
FIG. 8A is a view illustrating a first type antenna printed on a dielectric carrier (DC) according to an example.
Figure 8B:
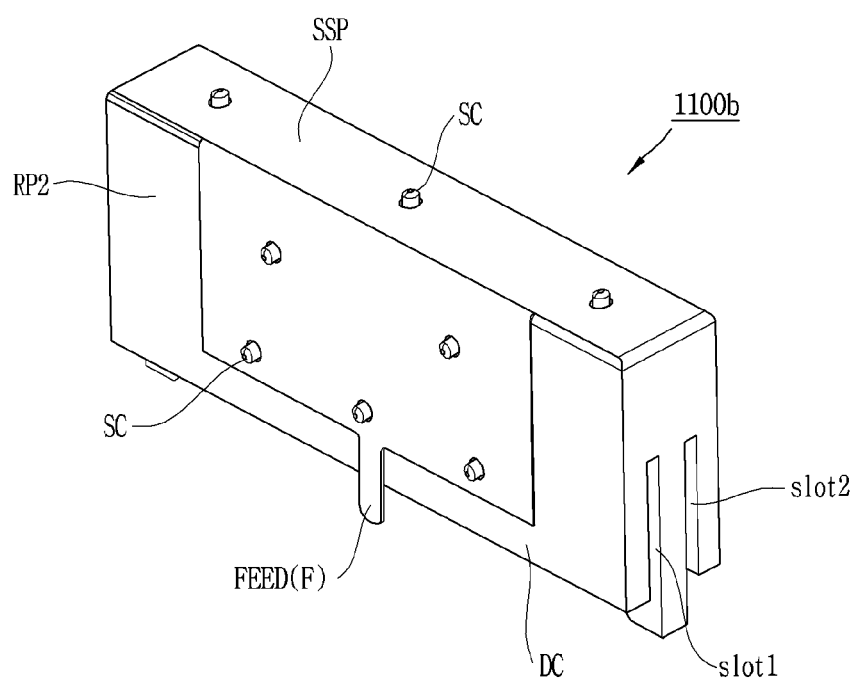
FIG. 8B is a view illustrating a second type antenna printed on a dielectric carrier (DC) according to an example.

The plurality of antennas 1100 may include a first antenna ANT1 or a second antenna ANT2. In this regard, FIG. 8A is a view illustrating a first type antenna printed on a dielectric carrier (DC) according to an example. FIG. 8B is a view illustrating a second type antenna printed on a dielectric carrier (DC) according to an example.

Referring to FIGS. 6 to 8B, the first antenna ANT1 may be connected to a first feeder of a circuit board S1 and may be configured to radiate a first signal through a first metal patch disposed on a front surface and one side (surface) of a dielectric carrier DC. On the other hand, the second antenna ANT2 may be connected to a second feeder of the circuit board S1 and may be configured to radiate a second signal through a second metal patch disposed on the front surface and the one side surface of the dielectric carrier DC.

In this regard, the first antenna ANT1 may be disposed in an antenna region corresponding to a central region of the circuit board S1. In this case, another side surface of the dielectric carrier DC of the first antenna ANT1, 1100*a* may be disposed on the circuit board S1.

On the other hand, the second antenna ANT2 may be disposed in a remote keyless entry (RKE) region located on the one side surface of the circuit board S1. In this case, a rear surface of the dielectric carrier of the second antenna ANT2 may be disposed on the circuit board S1.

Referring to FIGS. 7A and 7B, the antenna system 1000 may be configured to protect internal components by a cover. In this regard, the cover may include a flat cover (CV_F) region that is coupled to the antenna region, which is the central region of the circuit board, and is formed in a flat shape.

In one implementation, the cover may further include slanted cover (CV_S) regions that are coupled to RKE regions, which are side regions of the circuit board, and are formed in a slanted shape. In addition, the cover may further include a connected cover (CV_C) region that is formed between the flat cover (CV_F) region and the slanted cover (CV_S) region. When the antenna system 1000 is mounted on the vehicle roof or inside the roof frame of the vehicle, antennas can be disposed even in side regions inside the vehicle by virtue of the cover formed in the streamlined shape.

In regard to the plurality of antennas 1100 disposed in the antenna system according to the one implementation, antenna technologies optimized to support low elevation radiation may be applied. In this regard, a low-profile structure may be implemented by using a metal patch disposed on a dielectric carrier for a broadband operation in the range of 615 MHz to 3800 MHz.

Meanwhile, such a broadband antenna structure may be provided with a small number of antennas relative to other antenna systems, to be disposed in a vehicle. This may result from that one antenna element can operate as a radiator in a middle band MB and a high band HB in addition to a low band LB. In addition, as the low-profile antenna implemented on the dielectric carrier is arranged in a small size on the circuit board S1, the ground cut can be minimized in the ground region, thereby facilitating the TCU circuit components to be mounted.

It will be clearly understood by those skilled in the art that various changes and modifications to the aforementioned implementations related to the antenna system are made without departing from the idea and scope of the present disclosure. Therefore, it should be understood that such various changes and modifications to the implementations fall within the scope of the appended claims.

Referring to FIG. 8A with respect to the configuration of the radiator, the first antenna ANT1, 1100*a* may include a radiation patch RP and a side surface patch SSP. The first antenna ANT1, 1100*a* may further include a parasitic patch PP. The radiation patch RP of the first antenna ANT1, 1100*a* may not be limited to have a circular shape, but may be changed into various shapes. For example, the radiation patch RP of the first antenna ANT1, 1100*a* may be implemented as a square patch RP2 as illustrated in FIG. 8B.

The radiation patch RP may be disposed on a front surface of the dielectric carrier DC, and the side surface patch SSP may be disposed on a side surface of the dielectric carrier. In this case, the side surface patch SSP may be connected to the radiation patch RP. However, the present disclosure may not be limited thereto, and the side surface patch SSP may be spaced apart to be coupled to the radiation patch RP.

In addition, the parasitic patch PP may be disposed on the rear surface of the dielectric carrier DC. Accordingly, the broadband antenna element according to the present disclosure may be referred to as a shaped monopole with parasitic element. In particular, in consideration of the shape of the radiation patch RP disposed on the front surface of the dielectric carrier DC, it may be referred to as a half circle shaped monopole with parasitic element. However, the shape of the radiation patch RP disposed on the front surface of the dielectric carrier DC may not be limited thereto, and the radiation patch RP may be implemented as a square patch as illustrated in FIG. 8B.

The radiation patch RP, RP2 and the parasitic patch PP may be connected to each other so as to operate as a monopole antenna. In this regard, the radiation patch RP, RP2 may include a plurality of screws SC disposed spaced apart from one another by predetermined distances. Some of the plurality of screws SC may be fastened to connect the radiation patch RP, RP2 and the parasitic patch PP. Meanwhile, some of the plurality of screws SC may not be coupled to be directly connected to the parasitic patch PP. In this case, some of the plurality of screws SC may be adjusted in depth by which they are inserted into the dielectric carrier DC, thereby allowing impedance matching to be performed for each corresponding band.

In one example, a plurality of screws SC may also be disposed on the side surface of the dielectric carrier to be spaced apart from one another by predetermined distances. In this case, the plurality of screws SC may be adjusted in depth by which they are inserted into the side surface of the dielectric carrier SC, thereby allowing impedance matching to be performed for each corresponding band.

In one example, the dielectric carrier may be configured such that the dielectric is removed from a partial region. As illustrated in FIGS. 8A and 8B, the dielectric carrier DC may include slot regions slot1 and slot2 formed by removing the dielectric by a predetermined thickness and length. As such, radiation efficiency of the antenna element 1100*a*, 1100*b* can be improved by the slot regions slot1 and slot2 from which the dielectric is removed. In this regard, a dielectric loss that is caused by current induced in the antenna element 1100*a*, 1100*b* can be reduced by the slot regions slot1 and slot2 from which the dielectric is removed.

Meanwhile, a feeder F connected to the radiation patch RP, RP2 to feed a signal may be disposed on the front surface of the dielectric carrier DC. In this regard, the feeder F of the antenna element 1100*a*, 1100*b* may be connected to a signal line of the transceiver circuit 1250. Accordingly, the transceiver circuit 1250 may transmit a signal to at least one of the plurality of antennas.

A broadband antenna element according to one implementation may operate effectively in a frequency band of 0.6 GH to 3.8 GHz. In addition, the broadband antenna element may have a low elevation radiation characteristic. In relation to those technical characteristics, a frequency band can be expanded and a radiation direction can be adjusted by using the parasitic patch PP.

In this regard, referring to FIG. 7C, some (ANT1 to ANT4) of the plurality of antenna elements in the antenna system 1000 may operate in the LB band of 617 MHz to 960 MHz. In addition, the plurality of antenna elements ANT1 to ANT6 may be configured to operate in the MB/HB band of 1400 MHz to 3800 MHz.

In one example, the radiation patch RP of the first antenna ANT1, as illustrated in FIG. 8A, may be the circular patch and the side surface patch SSP may be disposed on an entire region of the side surface. In this case, the circular patch RP may be formed to have a diameter that is the same as a length of the side surface patch SSP. Accordingly, an overall size of the antenna can be increased so as to improve low-band impedance matching characteristics and increase antenna efficiency.

In another example, the radiation patch RP2 of the first antenna ANT1, as illustrated in FIG. 8B, may be the square patch and the side surface patch SSP may be disposed on an entire region of the side surface. In this case, a length of the square patch at a point connected to the side surface patch SSP may be shorter than a length of the side surface patch. In this regard, since an effective area of the square patch is larger than that of the circular patch, the length of the square patch may be smaller than the length of the side surface patch SSP.

Meanwhile, although it is illustrated that the parasitic patch PP is not disposed on the rear surface of the dielectric carrier DC in FIG. 8B, the present disclosure may not be limited thereto, and the parasitic patch PP may be disposed for bandwidth expansion and radial direction control.

In this regard, the second antenna ANT2 disposed in a remote keyless entry (RKE) region located on one side of the circuit board S1 may be implemented as a first type antenna as illustrated in FIG. 8A. The configuration of the second antenna ANT2 may not be limited thereto, and may be implemented as a second type antenna as illustrated in FIG. 8B.

On the other hand, a plurality of antennas 1100 according to one implementation may include a third antenna ANT3 or a fourth antenna ANT4. The third antenna ANT3 may be connected to a third feeder of the circuit board S1 and may be configured to radiate a third signal through a third metal patch disposed on a front surface and one side surface of the dielectric carrier DC. In addition, the fourth antenna ANT4 may be connected to a fourth feeder of the circuit board S1 and may be configured to radiate a fourth signal through a fourth metal patch disposed on the front surface and the one side surface of the dielectric carrier DC. In this case, the third antenna ANT3 may be disposed in an antenna region corresponding to a central region of the circuit board S1. On the other hand, the fourth antenna ANT4 may be disposed in a remote keyless entry (RKE) region disposed on another side of the circuit board S1.

In this regard, the third antenna ANT3 disposed in an antenna region of a central portion of the circuit board S1 may be implemented as a first type antenna as illustrated in FIG. 8A. The configuration of the third antenna ANT3 may not be limited thereto, and may be implemented as a second type antenna as illustrated in FIG. 8B.

In this regard, the fourth antenna ANT4 disposed in the RKE region located on the another side of the circuit board S1 may be implemented as a first type antenna as illustrated in FIG. 8A. The configuration of the fourth antenna ANT4 may not be limited thereto, and may be implemented as a second type antenna as illustrated in FIG. 8B.

Meanwhile, the plurality of antennas 1100 according to the one implementation may include a fifth antenna ANT5 or a sixth antenna ANT6. The fifth antenna ANT5 may be connected to a fifth feeder of the circuit board S1 and may be configured to radiate a fifth signal through a fifth metal patch disposed on a front surface and one side of the dielectric carrier DC. In addition, the sixth antenna ANT6 may be connected to a sixth feeder of the circuit board S1 and may be configured to radiate a sixth signal through a sixth metal patch disposed on the front surface and the one side surface of the dielectric carrier DC. In this case, the fifth antenna ANT5 and the sixth antenna ANT6 may be disposed in the antenna region corresponding to the central region of the circuit board S1.

The plurality of antennas 1100 disposed on the circuit board S1 in the antenna system 1100 may be controlled by the transceiver circuit 1250 and/or the baseband processor 1400. Accordingly, the antenna system 1100 according to the one implementation may include the transceiver circuit 1250 and/or the baseband processor 1400.

The transceiver circuit 1250 may be disposed on the circuit board S1 or another circuit board. The transceiver circuit 1250 may control a signal to be radiated through at least one of the first antenna ANT1 and the second antenna ANT2. The baseband processor 1400 may be disposed on the circuit board S1 or another circuit board, and operatively connected to the transceiver circuit 1250. The baseband processor 1400 may be disposed on the rear surface of the circuit board S1. The baseband processor 1400 may perform MIMO by radiating the first signal and the second signal through the first antenna ANT1 and the second antenna ANT2.

In this regard, referring to FIG. 7C, the first antenna ANT1 and the second antenna ANT2 may be configured to perform MIMO in the LB band. On the other hand, the first antenna ANT1 and the second antenna ANT2 may be configured to perform MIMO in the MB/HB band. In this case, the fifth antenna ANT5 and the sixth antenna ANT6 may be configured to perform MIMO in the MB/HB band. The third antenna ANT3 and the fourth antenna ANT4 may be configured to operate as DSDA antennas in the LB/MB/HB band.

Referring to FIGS. 6 to 8B, the first antenna ANT1 may be disposed on one side in the antenna region of the circuit board S1, and the third antenna ANT3 may be disposed on another side in the antenna region. Also, the fifth antenna ANT5 may be disposed on a lower portion of the antenna region, and the sixth antenna ANT6 may be disposed on an upper portion of the antenna region.

In this regard, the fifth antenna ANT5 may be disposed at an angle rotated by a predetermined angle with respect to the first antenna ANT1. In one example, the fifth antenna ANT5 may be disposed at an angle rotated by 90 degrees with respect to the first antenna ANT1. On the other hand, the third antenna ANT3 may be disposed at an angle rotated by a predetermined angle with respect to the fifth antenna ANT5. In one example, the third antenna ANT3 may be disposed at an angle rotated by 90 degrees with respect to the fifth antenna ANT5. Also, the sixth antenna ANT6 may be disposed at an angle rotated by a predetermined angle with respect to the third antenna ANT3. In one example, the sixth antenna ANT6 may be disposed at an angle rotated by 90 degrees with respect to the third antenna ANT3.

Meanwhile, the plurality of antennas ANT2 and ANT4 may be disposed adjacent to the RKE antennas RKE1 and RKE2. In this regard, the second antenna ANT2 may be disposed in a first RKE region located on one side of the circuit board S1. In addition, the fourth antenna ANT4 may be disposed in a second RKE region located on another side of the circuit board S1. In this regard, FIG. 9 is an enlarged view illustrating one side region of an antenna system in which an RKE antenna and a second antenna are disposed.

It will be clearly understood by those skilled in the art that various changes and modifications to the aforementioned implementations related to the antenna system and the plurality of antennas are made without departing from the idea and scope of the present disclosure. Therefore, it should be understood that such various changes and modifications to the implementations fall within the scope of the appended claims.

Figure 9:
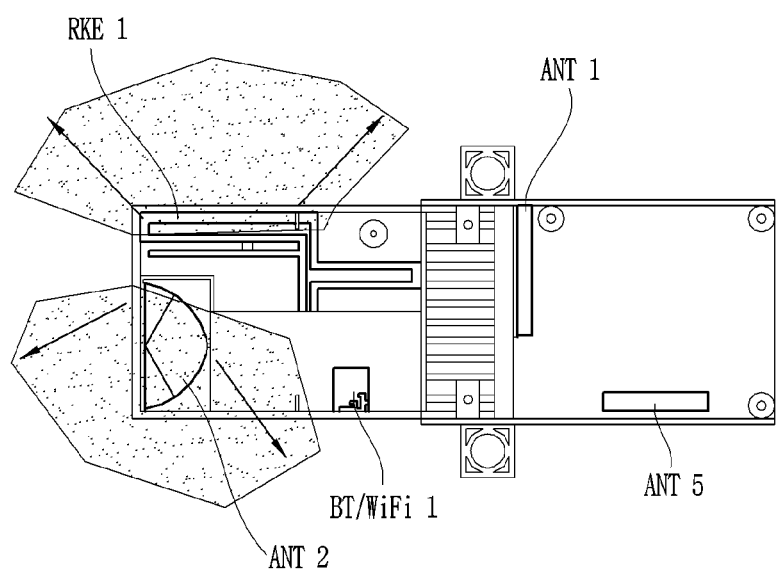
FIG. 9 is an enlarged view illustrating one side region of an antenna system in which an RKE antenna and a second antenna are disposed.

Referring to FIGS. 7A and 9, the second antenna ANT2 may be disposed on a lower left portion of a first RKE region located on one side of the circuit board S1. The first RKE antenna RKE1 may be disposed on an upper left portion of the first RKE region. Accordingly, interference may occur between a signal radiated by the first RKE antenna RKE1 and a signal radiated by the second antenna ANT2. In addition, the fourth antenna ANT4 may be disposed on an upper right portion of a second RKE region located on another side of the circuit board S1. Accordingly, the second RKE antenna RKE2 may be disposed on a lower right portion of the second RKE region.

As described above, the second antenna ANT2 may be configured such that the parasitic patch PP is disposed on the rear surface of the dielectric carrier DC. Accordingly, the second antenna ANT2 may be referred to as a shaped monopole with parasitic element. In particular, in consideration of the shape of the radiation patch RP disposed on the front surface of the dielectric carrier DC, it may be referred to as a half circle shaped monopole with parasitic element. However, the shape of the radiation patch RP disposed on the front surface of the dielectric carrier DC may not be limited thereto, and the radiation patch RP may be implemented as a square patch as illustrated in FIG. 8B.

In this regard, the second antenna ANT2 may be configured to operate effectively in a frequency band of 0.6 GH to 3.8 GHz. In addition, the second antenna ANT2 may have a low elevation radiation characteristic. Accordingly, the second antenna ANT2 can expand a frequency and adjust a radiation direction to low elevation by using the parasitic patch PP. This can reduce interference between the second antenna ANT2 and the first RKE antenna RKE1 radiated in the low elevation direction.

Similarly, the fourth antenna ANT4 may also be configured such that the parasitic patch PP is disposed on the rear surface of the dielectric carrier DC. Accordingly, the second antenna ANT2 may be referred to as a shaped monopole with parasitic element. In particular, in consideration of the shape of the radiation patch RP disposed on the front surface of the dielectric carrier DC, it may be referred to as a half circle shaped monopole with parasitic element. However, the shape of the radiation patch RP disposed on the front surface of the dielectric carrier DC may not be limited thereto, and the radiation patch RP may be implemented as a square patch as illustrated in FIG. 8B.

In this regard, the fourth antenna ANT4 may be configured to operate effectively in a frequency band of 0.6 GH to 3.8 GHz. In addition, the fourth antenna ANT4 may have a low elevation radiation characteristic. Accordingly, the fourth antenna ANT4 can expand a frequency and adjust a radiation direction to low elevation by using the parasitic patch PP. This can reduce interference between the fourth antenna ANT4 and the second RKE antenna RKE2 radiated in the low elevation direction.

Meanwhile, a first BT/WiFi antenna BT/WiFi1 may be disposed under the first RKE region of the antenna system 1000. In addition, a second BT/WiFi antenna BT/WiFi2 may be disposed above the second RKE region of the antenna system 1000. In this regard, the first BT/WiFi antenna BT/WiFi1 and the second BT/WiFi antenna BT/WiFi2 may be formed in a symmetrical structure to reduce interference therebetween. The first RKE antenna RKE1 disposed in the first RKE region and the second RKE antenna RKE2 disposed in the second RKE region may also be formed in a symmetrical structure to reduce interference therebetween. The second RKE antenna ANT2 disposed in the first RKE region and the fourth RKE antenna ANT4 disposed in the second RKE region may also be formed in a symmetrical structure to reduce interference therebetween.

With respect to the interference, antenna isolation in a broad frequency band of 615 MHz to 3800 MHz may be technically more difficult to be secured than that in the existing narrow band. In this regard, a spacing between antennas may be considered to ensure the isolation between the antennas. In addition, antenna pattern arrangement for minimizing movement of displacement current on the PCB may be considered.

Accordingly, it may be necessary to secure the isolation among all the antennas by 10 dB or more in a manner of adjusting an antenna gain value within allowable performance among the plurality of antennas disposed in the antenna system 100. In particular, it may be necessary to secure isolation of 10 dB or more from an RKE antenna operating in a 300 MHz band, which has a longer wavelength than 600 MHz. To this end, the present disclosure may design an RKE antenna in consideration of a radiation direction and use a mechanism of adjusting a radiation direction of an LTE antenna utilizing a parasitic element.

It will be clearly understood by those skilled in the art that various changes and modifications to the aforementioned implementations related to the antenna system and the plurality of antennas are made without departing from the idea and scope of the present disclosure. Therefore, it should be understood that such various changes and modifications to the implementations fall within the scope of the appended claims.

Figure 10A:
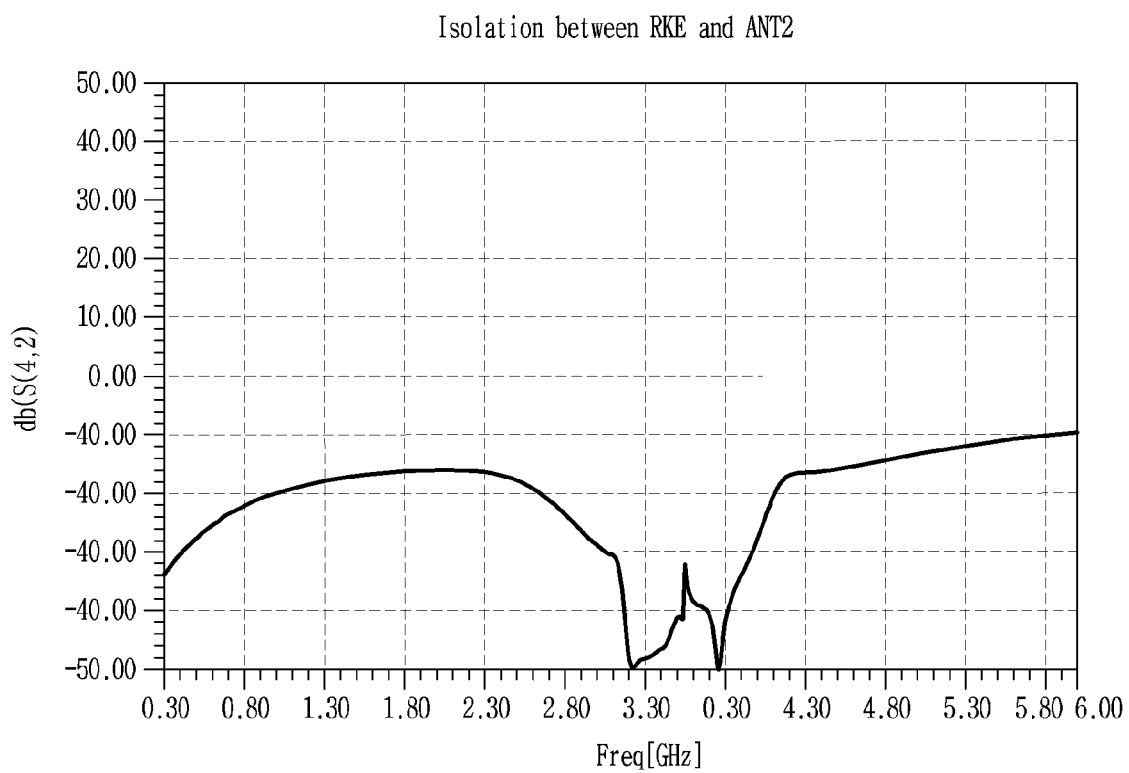
FIG. 10A is a graph illustrating an isolation characteristic between an RKE antenna and a second antenna.

FIG. 10A is a graph illustrating an isolation characteristic between an RKE antenna and a second antenna. Also, FIG. 10B is a view illustrating an isolation characteristic between the RKE antenna and the second antenna for each corresponding frequency. Referring to FIGS. 10A and 10B, the isolation characteristic between the RKE antenna and the second antenna may be −30 dB or less in a 300 MHz band. In addition, the isolation characteristic between the RKE antenna and the second antenna may be −20 dB or less in a 600 MHz band.

Meanwhile, as described above, the plurality of antennas 1100 may be arranged to optimize antenna characteristics and isolation between adjacent antennas. In this regard, the first antenna ANT1, the third antenna ANT3, the fifth antenna ANT5, and the sixth antenna ANT6 may be disposed perpendicular to the circuit board S1. On the other hand, the second antenna ANT2 and the fourth antenna ANT4 may be disposed on the circuit board S1 so that a signal is radiated to the front through the radiation patch disposed on the front surface of the dielectric carrier DC.

Meanwhile, the first antenna ANT1 and the third antenna ANT3 may be disposed in a symmetrical form with respect to the center of the circuit board S1 in left and right directions. Also, the fifth antenna ANT5 and the sixth antenna ANT6 may be disposed in a symmetrical form with respect to the center of the circuit board S1 in up and down directions. That is, a spacing between the plurality of antennas 1100 may increase and different metal patterns may be disposed on the antennas to face each other. This can reduce interference between adjacent antenna elements among the plurality of antennas 1100.

Meanwhile, the radiation patch RP of each of the second antenna ANT2 and the fourth antenna ANT4 may be a circular patch, and the side surface patch SSP disposed on the dielectric carrier DC may be disposed on the entire side surface region. In this case, the circular patch RP may be formed to have a diameter that is the same as a length of the side surface patch SSP.

In one implementation, the baseband processor 1400 may perform MIMO using the plurality of antennas 1100 in the antenna system 1000. The antenna system 1000 may include the transceiver circuit 1250 and the baseband processor 1400 as described above. For example, the baseband processor 1400 may perform 2×2 MIMO or 4×4 MIMO using some of the plurality of antennas 1100.

Referring to FIGS. 7A to 7C, the baseband processor 1400 may control the transceiver circuit 1250 to perform 4×4 MIMO through the first antenna ANT1, the second antenna ANT2, the fifth antenna ANT5, and the sixth antenna ANT6. This can maintain distances between the antenna region and the RKE regions of the circuit board S1, thereby improving an isolation characteristic. The isolation characteristic can also be improved by using antennas that are disposed in the antenna region of the circuit board S1 in a rotated state by a predetermined angle. Meanwhile, the baseband processor 1400 may control the transceiver circuit 1250 to perform 2×2 dual sim dual active (DSDA) through the third antenna ANT3 and the fourth antenna ANT4.

In another implementation, the baseband processor 1400 may control the transceiver circuit 1250 to perform 4×4 MIMO through the first antenna ANT1, the second antenna ANT2, the third antenna ANT3, and the fourth antenna ANT4. This can maintain distances between the antenna region and the RKE regions of the circuit board S1, thereby improving an isolation characteristic. The isolation characteristic can also be improved by using antennas that are disposed in the antenna region of the circuit board S1 in a rotated state by a predetermined angle. Meanwhile, the baseband processor 1400 may control the transceiver circuit 1250 to perform 2×2 dual sim dual active (DSDA) through the fifth antenna ANT5 and the sixth antenna ANT6.

In this regard, the first to fourth antennas ANT1 to ANT4 may operate in the LB band, which corresponds to a band of 617 MHz to 960 MHz. Also, the first to fourth antennas ANT1 to ANT4 may operate in the MB band and the HB band, which correspond to a band of 1400 MHz to 3800 MHz.

The fifth antenna ANT5 and the sixth antenna ANT6 may operate in the MB band and the HB band. Therefore, the baseband processor 1400 may perform MIMO through the firth antenna ANT1 and the second antenna ANT2 in the LB band. On the other hand, the baseband processor 1400 may perform 4×4 MIMO through the first antenna ANT1, the second antenna ANT2, the fifth antenna ANT5, and the sixth antenna ANT6 in the MB band and the HB band.

In relation to the antenna system 1000 including the plurality of antennas 1100 according to FIGS. 5A to 9, the interference between the RKE antenna and an adjacent antenna has been described in FIGS. 10A and 10B. In this regard, FIG. 11A is a view illustrating reflection coefficients for a plurality of antennas in units of dB. FIG. 11B is a view illustrating gain characteristics for the plurality of antennas.

Referring to FIG. 11A, the RKE antenna, the plurality of antennas ANT1 to ANT6 operating from the LB band to the HB band, and the BT/WiFi antennas may have reflection coefficient characteristics of −7 dB or less. Also, referring to FIG. 11B, the plurality of antennas ANT1 to ANT6 operating from the LB band to the HB band may have gain characteristics of −2 dBi or more in most bands. In this regard, the gains of the plurality of antennas ANT1 to ANT6 may be gain values in the range of 70 degrees to 90 degrees of the boresight with respect to 0 degree, namely, in a low elevation region.

It will be clearly understood by those skilled in the art that various changes and modifications to the aforementioned implementations related to the antenna system and the plurality of antennas are made without departing from the idea and scope of the present disclosure. Therefore, it should be understood that such various changes and modifications to the implementations fall within the scope of the appended claims.

FIG. 12A is a view illustrating isolation characteristics among a plurality of antennas. Referring to FIG. 12A, an isolation characteristic of −10 dB or less for the combination of the plurality of antennas may be obtained. In particular, an isolation characteristic of −10 dB or less between the first RKE antenna RKE1 and the second antenna ANT2 disposed in an adjacent region may be obtained. Also, an isolation characteristic of −10 dB or less between the second RKE antenna RKE2 and the fourth antenna ANT4 disposed in an adjacent region may be obtained.

In addition, FIG. 12B is a view illustrating Cumulative Density Function (CDF) characteristics in a cellular band and a Bluetooth/WiFi band. Referring to FIG. 12B, it can be seen that both P10 and P90-P10 values satisfy requirements for each corresponding band. Here, P10 and P90 may mean power values corresponding to 10% and 90% probability values in a cumulative detection (reception) probability graph according to a power level in a corresponding band.

The foregoing description has been given of the antenna system including the plurality of antennas according to the one implementation. Hereinafter, a vehicle in which an antenna system including a plurality of antennas is mounted will be described. In this regard, the previous description will also be applicable to a vehicle having an antenna system described below.

It will be clearly understood by those skilled in the art that various changes and modifications to the aforementioned implementations related to the antenna system having the plurality of antennas and the vehicle having the antenna system are made without departing from the idea and scope of the present disclosure. Therefore, it should be understood that such various changes and modifications to the implementations fall within the scope of the appended claims.

The broadband antenna system according to the present disclosure may be mounted in the vehicle in the structure illustrated in FIGS. 3A to 3C. That is, the broadband antenna system mounted to the vehicle may be mounted on a roof of the vehicle, inside the roof, or inside a roof frame, as illustrated in FIGS. 3A to 3C.

Figure 13:
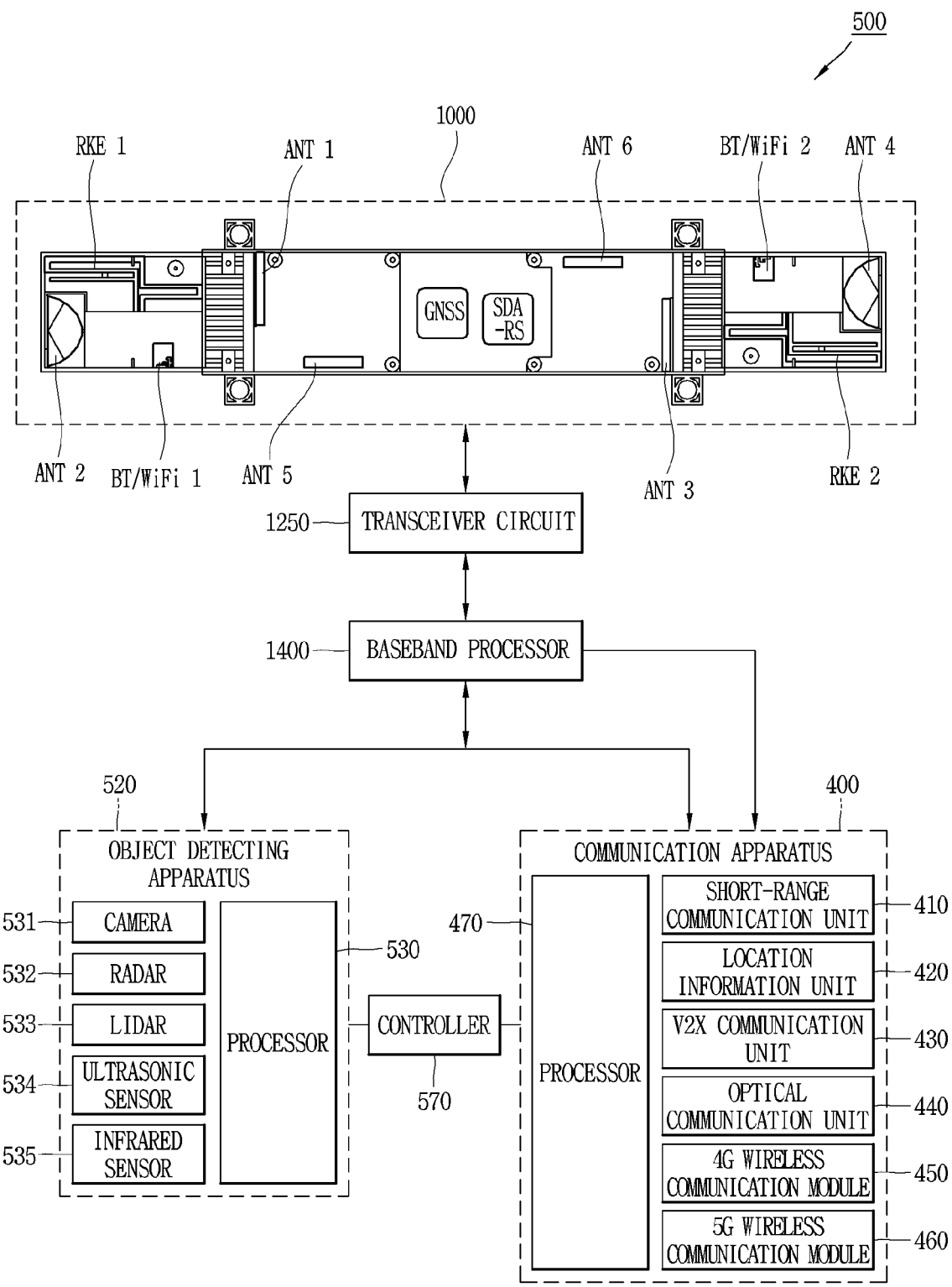
FIG. 13 is a block diagram illustrating a broadband antenna system and a vehicle in which the antenna system is mounted according to the present disclosure.

FIG. 13 is a block diagram illustrating a broadband antenna system and a vehicle in which the antenna system is mounted according to the present disclosure. Referring to FIG. 13, the broadband antenna system 1000 may be mounted in the vehicle. The antenna system may perform short-range communication, wireless communication, V2X communication, and the like by itself or through the communication apparatus 400. To this end, the baseband processor 1400 may be configured to receive signals from or transmit signals to adjacent vehicles, RSUs, and base stations through the antenna system 1000.

Alternatively, the baseband processor 1400 may be configured to receive signals from or transmit signals to adjacent vehicles, RSUs, and base stations through the communication apparatus 400. Here, the information related to adjacent objects may be acquired through the object detecting apparatus such as the camera 331, the radar 332, the LiDar 333, and the sensors 334 and 335 of the vehicle 300. Alternatively, the baseband processor 1400 may be configured to receive signals from or transmit signals to adjacent vehicles, RSUs, and base stations through the communication apparatus 400 and the antenna system 1000.

Meanwhile, referring to FIGS. 1 to 13, the vehicle 500 having the antenna system 1000 may include the plurality of antennas 1100, the transceiver circuit 1250, and the baseband processor 1400. The vehicle 500 may further include the object detecting apparatus 520. The vehicle 500 may further include the communication apparatus 400. Here, the communication apparatus 400 may be configured to perform wireless communication through an indoor antenna unit.

In this regard, the vehicle 500 may be provided with the antenna system 1000. The antenna system 1000 may include the circuit board S1 and the plurality of antennas 1100. The antenna system 1000 may further include the transceiver circuit 1250 and the baseband processor 1400.

The circuit board S1 may be disposed to be spaced apart by a predetermined distance from a metal frame, which is disposed inside the roof or roof frame of the vehicle. In this case, the metal frame may correspond to a lower end of the antenna system 1000 and may be implemented as a heat sink. The plurality of antennas 1100 may include a first antenna ANT1 or a second antenna ANT2.

The first antenna ANT1 may be connected to a first feeder of the circuit board S1 and may be configured to radiate a first signal through a first metal patch disposed on a front surface and one side surface of a dielectric carrier DC. On the other hand, the second antenna ANT2 may be connected to a second feeder of the circuit board S1 and may be configured to radiate a second signal through a second metal patch disposed on the front surface and the one side surface of the dielectric carrier DC.

In this regard, the first antenna ANT1 may be disposed in an antenna region corresponding to a central region of the circuit board S1. In this case, another side surface of the dielectric carrier DC of the first antenna ANT1, 1100*a* may be disposed on the circuit board S1. Meanwhile, the second antenna ANT2 may be disposed in a remote keyless entry (RKE) region disposed on the one side surface of the circuit board S1. In this case, a rear surface of the dielectric carrier of the second antenna ANT2 may be disposed on the circuit board S1.

The first antenna ANT1, 1100*a* may include a radiation patch RP and a side surface patch SSP. The first antenna ANT1, 1100*a* may further include a parasitic patch PP. The radiation patch RP of the first antenna ANT1, 1100*a* may not be limited to have a circular shape, but may be changed into various shapes. For example, the radiation patch RP of the first antenna ANT1, 1100*a* may be implemented as a square patch RP2 as illustrated in FIG. 8B.

The radiation patch RP may be disposed on a front surface of the dielectric carrier DC, and the side surface patch SSP may be disposed on a side surface of the dielectric carrier. In this case, the side surface patch SSP may be connected to the radiation patch RP. However, the present disclosure may not be limited thereto, and the side surface patch SSP may be spaced apart to be coupled to the radiation patch RP.

In addition, the parasitic patch PP may be disposed on a rear surface of the dielectric carrier DC. Accordingly, the broadband antenna element may be referred to as a shaped monopole with parasitic element. In particular, in consideration of the shape of the radiation patch RP disposed on the front surface of the dielectric carrier DC, it may be referred to as a half circle shaped monopole with parasitic element. However, the shape of the radiation patch RP disposed on the front surface of the dielectric carrier DC may not be limited thereto, and the radiation patch RP may be implemented as a square patch.

In one example, the radiation patch RP of the first antenna ANT1 may be a circular patch and the side surface patch SSP may be disposed on an entire region of the side surface. In this case, the circular patch RP may be formed to have a diameter that is the same as a length of the side surface patch SSP. Accordingly, an overall size of the antenna can be increased so as to improve low-band impedance matching characteristics and increase antenna efficiency.

In another example, the radiation patch RP2 of the first antenna ANT1 may be a square patch and the side surface patch SSP may be disposed on an entire region of the side surface. In this case, a length of the square patch at a point connected to the side surface patch SSP may be shorter than a length of the side surface patch. In this regard, since an effective area of the square patch is larger than that of the circular patch, the length of the square patch may be smaller than the length of the side surface patch SSP. Meanwhile, although it is illustrated that the parasitic patch PP is not disposed on the rear surface of the dielectric carrier DC, the present disclosure may not be limited thereto, and the parasitic patch PP may be disposed for bandwidth expansion and radial direction control.

The plurality of antennas 1100 according to one implementation may include a third antenna ANT3 or a fourth antenna ANT4. The third antenna ANT3 may be connected to a third feeder of the circuit board S1 and may be configured to radiate a third signal through a third metal patch disposed on a front surface and one side surface of the dielectric carrier DC. In addition, the fourth antenna ANT4 may be connected to a fourth feeder of the circuit board S1 and may be configured to radiate a fourth signal through a fourth metal patch disposed on the front surface and the one side surface of the dielectric carrier DC. In this case, the third antenna ANT3 may be disposed in an antenna region corresponding to a central region of the circuit board S1. On the other hand, the fourth antenna ANT4 may be disposed in a remote keyless entry (RKE) region disposed on another side of the circuit board S1.

In this regard, the third antenna ANT3 disposed in the antenna region of the central portion of the circuit board S1 may be implemented as a first type antenna. The configuration of the third antenna ANT3 may not be limited thereto, and may be implemented as a second type antenna. The fourth antenna ANT4 disposed in the RKE region located on the another side of the circuit board S1 may be implemented as a first type antenna. The configuration of the fourth antenna ANT4 may not be limited thereto, and may be implemented as a second type antenna.

The plurality of antennas 1100 according to one implementation may include a fifth antenna ANT5 or a sixth antenna ANT6. The fifth antenna ANT5 may be connected to a fifth feeder of the circuit board S1 and may be configured to radiate a fifth signal through a fifth metal patch disposed on a front surface and one side surface of the dielectric carrier DC. In addition, the sixth antenna ANT6 may be connected to a sixth feeder of the circuit board S1 and may be configured to radiate a sixth signal through a sixth metal patch disposed on the front surface and the one side surface of the dielectric carrier DC. In this case, the fifth antenna ANT5 and the sixth antenna ANT6 may be disposed in the antenna region corresponding to the central region of the circuit board S1.

The plurality of antennas 1100 disposed on the circuit board S1 in the antenna system 1100 may be controlled by the transceiver circuit 1250 and/or the baseband processor 1400. Accordingly, the antenna system 1100 according to the one implementation may include the transceiver circuit 1250 and/or the baseband processor 1400.

The transceiver circuit 1250 may be disposed on the circuit board S1 or another circuit board. The transceiver circuit 1250 may control a signal to be radiated through at least one of the first antenna ANT1 and the second antenna ANT2. The baseband processor 1400 may be disposed on the circuit board S1 or another circuit board, and operatively connected to the transceiver circuit 1250. The baseband processor 1400 may be disposed on the rear surface of the circuit board S1. The baseband processor 1400 may perform MIMO by radiating the first signal and the second signal through the first antenna ANT1 and the second antenna ANT2.

In this regard, the first antenna ANT1 and the second antenna ANT2 may be configured to perform MIMO in the LB band. The first antenna ANT1 and the second antenna ANT2 may be configured to perform MIMO in the MB/HB band. In this case, the fifth antenna ANT5 and the sixth antenna ANT6 may be configured to perform MIMO in the MB/HB band. The third antenna ANT3 and the fourth antenna ANT4 may be configured to operate as DSDA antennas in the LB/MB/HB band.

The first antenna ANT1 may be disposed on one side in the antenna region of the circuit board S1, and the third antenna ANT3 may be disposed on another side in the antenna region. Also, the fifth antenna ANT5 may be disposed on a lower portion of the antenna region, and the sixth antenna ANT6 may be disposed on an upper portion of the antenna region. In this regard, the fifth antenna ANT5 may be disposed at an angle rotated by a predetermined angle with respect to the first antenna ANT1. In one example, the fifth antenna ANT5 may be disposed at an angle rotated by 90 degrees with respect to the first antenna ANT1. On the other hand, the third antenna ANT3 may be disposed at an angle rotated by a predetermined angle with respect to the fifth antenna ANT5. In one example, the third antenna ANT3 may be disposed at an angle rotated by 90 degrees with respect to the fifth antenna ANT5. Also, the sixth antenna ANT6 may be disposed at an angle rotated by a predetermined angle with respect to the third antenna ANT3. In one example, the sixth antenna ANT6 may be disposed at an angle rotated by 90 degrees with respect to the third antenna ANT3.

In one implementation, the baseband processor 1400 may perform MIMO using the plurality of antennas 1100 in the antenna system 1000. The antenna system 1000 may include the transceiver circuit 1250 and the baseband processor 1400 as described above. For example, the baseband processor 1400 may perform 2×2 MIMO or 4×4 MIMO using some of the plurality of antennas 1100.

The baseband processor 1400 may control the transceiver circuit 1250 to perform 4×4 MIMO through the first antenna ANT1, the second antenna ANT2, the fifth antenna ANT5, and the sixth antenna ANT6. This can maintain distances between the antenna region and the RKE regions of the circuit board S1, thereby improving an isolation characteristic. The isolation characteristic can also be improved by using antennas that are disposed in the antenna region of the circuit board S1 in a rotated state by a predetermined angle. Meanwhile, the baseband processor 1400 may control the transceiver circuit 1250 to perform 2×2 dual sim dual active (DSDA) through the third antenna ANT3 and the fourth antenna ANT4.

In another implementation, the baseband processor 1400 may control the transceiver circuit 1250 to perform 4×4 MIMO through the first antenna ANT1, the second antenna ANT2, the third antenna ANT3, and the fourth antenna ANT4. This can maintain distances between the antenna region and the RKE regions of the circuit board S1, thereby improving an isolation characteristic. The isolation characteristic can also be improved by using antennas that are disposed in the antenna region of the circuit board S1 in a rotated state by a predetermined angle. Meanwhile, the baseband processor 1400 may control the transceiver circuit 1250 to perform 2×2 dual sim dual active (DSDA) through the fifth antenna ANT5 and the sixth antenna ANT6.

Therefore, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. Therefore, the communication capacity of the vehicle can be improved through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

As described above, the plurality of antenna elements ANT1 to ANT6 implemented on the dielectric carrier may operate in the full band including the low band LB, the middle band MB, and the high band HB. Here, the low band LB may be referred to as the first frequency band and the middle band MB and the high band HB may be referred to as the second frequency band. Accordingly, the baseband processor 1400 can perform MIMO through some of the plurality of antenna elements ANT1 to ANT6 in the first frequency band. Also, the baseband processor 1400 can perform MIMO through some of the plurality of antenna elements ANT1 to ANT6 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

Meanwhile, the first antenna ANT1 and the second antenna ANT2 of the antenna system 1000 may operate as radiators in the low band LB, which is the first frequency band. In this regard, the first to fourth antennas ANT1 to ANT4 may operate as radiators in the low band LB, which is the first frequency band. On the other hand, the first antenna ANT1, the second antenna ANT2, the fifth antenna ANT5, and the sixth antenna ANT6 may operate as radiators in the second frequency band, which includes the middle band MB and the high band HB.

Accordingly, the baseband processor 1400 may control the transceiver circuit 1250 to receive the second signal of the second frequency band while receiving the first signal of the first frequency band through one of the first to fourth antennas ANT1 to ANT4. In this case, the baseband processor 1400 can advantageously perform carrier aggregation (CA) through one antenna.

Alternatively, the baseband processor 1400 may control the transceiver circuit 1250 to receive the second signal of the second frequency band through one of the fifth antenna ANT5 and the sixth antenna ANT6 while receiving the first signal of the first frequency band through one of the first antenna ANT1 and the second antenna ANT2. In this case, there may be an advantage that each antenna can be designed to be optimized in a corresponding band and implemented to operate in the band.

Therefore, the baseband processor 1400 can perform carrier aggregation (CA) through a band in which the first frequency band and the second frequency band are coupled to each other. When it is necessary to receive a large amount of data for autonomous driving and the like, a broadband reception can be allowed through the CA.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

It will be clearly understood by those skilled in the art that various changes and modifications to the aforementioned implementations related to the antenna system having the plurality of antennas, the vehicle having the antenna system, and the control operations thereof are made without departing from the idea and scope of the present disclosure. Therefore, it should be understood that such various changes and modifications to the implementations fall within the scope of the appended claims.

In the above, the antenna system mounted in the vehicle and the vehicle equipped with the antenna system have been described. Hereinafter, a description will be given of an antenna system mounted on a vehicle, a vehicle having the antenna system, and a wireless communication system including a base station. In this regard, FIG. 14 is a block diagram illustrating f a wireless communication system that is applicable to methods proposed herein.

Figure 14:
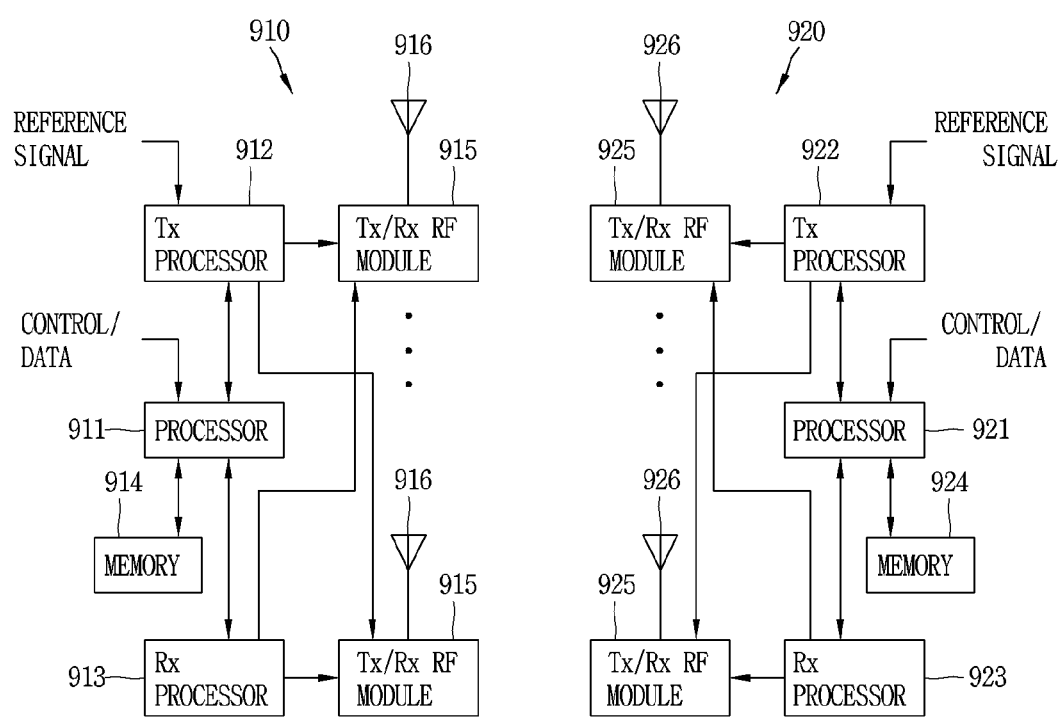
FIG. 14 is an exemplary block diagram of a wireless communication system that is applicable to methods proposed in the present disclosure.

Referring to FIG. 14, the wireless communication system may include a first communication device 910 and/or a second communication device 920. The term 'A and/or B' may be interpreted as having the same meaning as 'including at least one of A or B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper layer packet from a core network may be provided to the processor 911. The processor may implement the function of an L2 layer. In DL, the processor may provide multiplexing between a logical channel and a transport channel and radio resource allocation to the second communication device 920, and may be responsible for signaling to the second communication device. The Tx processor 912 may implement various signal processing functions for an L1 layer (i.e., a physical layer). The signal processing function may facilitate forward error correction (FEC) in the second communication device, and include coding and interleaving. Encoded and modulated symbols may be divided into parallel streams. Each stream may be mapped to an OFDM subcarrier, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to the different antenna 916 via the separate Tx/Rx module (or transceiver) 915. Each Tx/Rx module may modulate an RF carrier into a spatial stream for transmission. The second communication device may receive a signal through the antenna 926 of each Tx/Rx module (or transceiver) 925. Each Tx/Rx module may recover information modulated to the RF carrier, and provide it to the RX processor 923. The RX processor may implement various signal processing functions of the layer 1. The RX processor may perform spatial processing with respect to information to recover an arbitrary spatial stream destined for the second communication device. If multiple spatial streams are destined for the second communication device, they may be combined into a single OFDMA symbol stream by plural RX processors. The RX processor may transform the OFDMA symbol stream from a time domain to a frequency domain by using Fast Fourier Transform (FFT). A frequency domain signal may include an individual OFDMA symbol stream for each subcarrier of the OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted by the first communication device on the physical channel. The corresponding data and control signal may then be provided to the processor 921.

UL (communication from the second communication device to the first communication device) may be processed in the first communication device 910 in a manner similar to that described with respect to the receiver function in the second communication device 920. Each Tx/Rx module 925 may receive a signal via the antenna 926. Each Tx/Rx module may provide the RF carrier and information to the RX processor 923. The processor 921 may be associated with the memory 924 that stores program code and data. The memory may be referred to as a computer-readable medium.

Meanwhile, when the first communication device is the vehicle, the second communication device may not be limited to the base station. In this regard, referring to FIG. 2A, the second communication device may be another vehicle, and V2V communication may be performed between the first communication device and the second communication device. On the other hand, the second communication device may be a pedestrian, and V2P communication may be performed between the first communication device and the second communication device. Also, the second communication device may be an RSU, and V2I communication may be performed between the first communication device and the second communication device. In addition, the second communication device may be an application server, and V2N communication may be performed between the first communication device and the second communication device.

In this regard, even when the second communication device is another vehicle, pedestrian, RSU, or application server, the base station may allocate resources for communication between the first communication device and the second communication device. Accordingly, a communication device configured to allocate resources for communication between the first communication device and the second communication device may be referred to as a third communication device. Meanwhile, the aforementioned series of communication procedures may also be performed among the first communication device to the third communication device.

In the above, the antenna system mounted in the vehicle and the vehicle equipped with the antenna system have been described. Hereinafter, technical effects of an antenna system mounted on a vehicle and a vehicle equipped with the antenna system will be described.

Hereinafter, technical effects of an antenna system mounted in a vehicle and a vehicle equipped with the antenna system will be described.

According to an implementation, antenna performance of an antenna system mounted in a vehicle can be improved while maintaining a height of the antenna system to be a predetermined level or lower.

According to an implementation, a structure for mounting an antenna system, which can operate in a broad frequency band, to a vehicle can be provided to support various communication systems by implementing a low band (LB) antenna and other antennas in one antenna module.

According an implementation, various structures of planar antennas which can operate in a broad frequency band can be provided by using a parasitic patch and a radiation patch implemented on a carrier.

According to an implementation, an antenna system can be optimized with different antennas in a low band and other bands. This can result in arranging the antenna system with optimal configuration and performance in a roof frame of a vehicle.

According to an implementation, an antenna system of a vehicle can implement MIMO and diversity operations using a plurality of antennas in specific bands.

According to an implementation, antennas that are printed on a dielectric carrier can be implemented in an optimal arrangement structure to operate in a broad frequency band, thereby improving antenna efficiency and secure isolation between the antennas.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the foregoing description, an antenna system mounted in a vehicle and a control operation therefor may be implemented by software, firmware, or a combination thereof. Meanwhile, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna system mounted in a vehicle, the system comprising:
    a circuit board disposed on a metal cradle located at a roof of the vehicle;
    a first antenna connected to a first feeder of the circuit board, comprising a first metal patch disposed at a front surface and a side surface of a first dielectric carrier and configured to radiate a first signal; and
    a second antenna connected to a second feeder of the circuit board, comprising a second metal patch disposed at a front surface and a side surface of a second dielectric carrier and configured to radiate a second signal in a same frequency band as the first signal,
    wherein another side of the first dielectric carrier is disposed on the circuit board and the first antenna forms a first radiation pattern,
    wherein a rear surface of the second dielectric carrier is disposed on the circuit board and the second antenna forms a second radiation pattern.

2. The system of claim 1, further comprising a dielectric cover configured to cover a central region and side regions of the circuit board opposite each other with respect to the central region,
    wherein the dielectric cover includes a flat cover region and a slanted cover region having a slanted surface,
    wherein the first antenna is disposed at the central region covered by the flat cover region,
    wherein the second antenna is disposed at a remote keyless entry (RKE) region disposed on a left side of the circuit board covered by the slanted cover region.

3. The system of claim 1, wherein the first antenna comprises:
    a radiation patch disposed at the front surface of the first dielectric carrier;
    a parasitic patch disposed at a rear surface of the first dielectric carrier; and a side surface patch disposed at a side surface of the first dielectric carrier and connected to the radiation patch,
wherein the first metal patch corresponds to at least the radiation patch and the side surface patch.

4. The system of claim 3, wherein the radiation patch is a circular patch and the side surface patch is disposed on an entire region of the side surface of the first dielectric carrier, and
wherein the circular patch has a diameter that is the same as a length of the side surface patch.

5. The system of claim 3, wherein the radiation patch is a square patch and the side surface patch is disposed on an entire region of the side surface of the first dielectric carrier, and
wherein a length of the square patch connected to the side surface patch is shorter than a length of the side surface patch.

6. The system of claim 2, further comprising:
a third antenna connected to a third feeder of the circuit board, comprising a third metal patch disposed at a front surface and a side surface of a third dielectric carrier and configured to radiate a third signal; and
a fourth antenna connected to a fourth feeder of the circuit board, comprising a fourth metal patch disposed at a front surface and a side surface of a fourth dielectric carrier and configured to radiate a fourth signal,
wherein the third antenna is disposed in an antenna region corresponding to the central region of the circuit board, and
wherein the fourth antenna is disposed in a remote keyless entry (RKE) region disposed on a right side of the circuit board covered by the slanted cover region.

7. The system of claim 6, further comprising:
a fifth antenna connected to a fifth feeder of the circuit board, comprising a fifth metal patch disposed at a front surface and a side surface of a fifth dielectric carrier and configured to radiate a fifth signal; and
a sixth antenna connected to a sixth feeder of the circuit board, comprising a sixth metal patch disposed at a front surface and a side surface of a sixth dielectric carrier and configured to radiate a sixth signal,
wherein the fifth antenna and the sixth antenna are disposed in the antenna region corresponding to the central region of the circuit board.

8. The system of claim 7, further comprising:
a transceiver circuit disposed on the circuit board; and
a baseband processor connected to the transceiver circuit and configured to perform multi-input/multi-output (MIMO) by radiating the first and second signals through the first antenna and the second antenna, respectively.

9. The system of claim 7, wherein the first antenna is disposed on one side of the antenna region and the third antenna is disposed on another side of the antenna region,
wherein the fifth antenna is disposed on a lower portion of the antenna region and the sixth antenna is disposed on an upper portion of the antenna region,
wherein the fifth antenna is disposed at an angle rotated by 90 degrees with respect to the first antenna, and
wherein the sixth antenna is disposed at an angle rotated by 90 degrees with respect to the third antenna.

10. The system of claim 9, wherein the second antenna is disposed in a first remote keyless entry (RKE) region disposed on one side of the circuit board, and
wherein the fourth antenna is disposed in a second RKE region disposed on another side of the circuit board.

11. The system of claim 7, wherein the first antenna, the third antenna, the fifth antenna, and the sixth antenna are disposed perpendicular to a longitudinal direction of the circuit board, and
wherein the second antenna and the fourth antenna are disposed parallel to the longitudinal direction of the circuit board so that signals are radiated toward a front through the metal patches on the front surface of the second and fourth dielectric carriers.

12. The system of claim 11, wherein the first antenna and the third antenna are disposed with respect to a center of the circuit board in a left to right direction, and
wherein the fifth antenna and the sixth antenna are disposed with respect to the center of the circuit board in an up and down direction.

13. The system of claim 12, wherein the second antenna is disposed on a lower left portion of a first RKE region on a first side of the circuit board, and a first RKE antenna is disposed on an upper left portion of the first RKE region, and
wherein the fourth antenna is disposed on an upper right portion of a second RKE region located on a second side of the circuit board, and a second RKE antenna is disposed on a lower right portion of the second RKE region.

14. The system of claim 11, wherein each of the second and fourth metal patches comprise a radiation patch, a parasitic patch and a side surface patch,
wherein respective radiation patches of the second and the fourth metal patches are implemented as circular patches, and respective side surface patches of the second antenna and the fourth metal patches are disposed on an entire region of respective side surfaces of the second and fourth dielectric carriers, and
wherein each circular patch has a diameter that is the same as a length of the side surface patches.

15. The system of claim 8, wherein the baseband processor is further configured to:
control the transceiver circuit to perform 4×4 MIMO through the first antenna, the second antenna, the fifth antenna, and the sixth antenna, and
control the transceiver circuit to perform 2×2 dual sim dual active (DSDA) through the third antenna and the fourth antenna.

16. The system of claim 8, wherein the first to fourth antennas are configured to operate in a low band (LB) corresponding to 617 MHz to 960 MHz, and a middle band (MB) and a high band (HB) corresponding to 1400 MHz to 3800 MHZ,
wherein the fifth antenna and the sixth antenna are configured to operate in the middle band (MB) and the high band (HB),
wherein the baseband processor performs 2×2 MIMO through the first antenna and the second antenna in the low band (LB), and
wherein the baseband processor performs 4×4 MIMO through the first antenna, the second antenna, the fifth antenna, and the sixth antenna in the middle band (MB) and the high band (HB).

17. A vehicle having an antenna system, the vehicle comprising:
a circuit board disposed on a metal cradle located at a roof of the vehicle;
a first antenna connected to a first feeder of the circuit board, comprising a first metal patch disposed at a front surface and a side surface of a first dielectric carrier and configured to radiate a first signal;

a second antenna connected to a second feeder of the circuit board, comprising a second metal patch disposed at a front surface and a side surface of a second dielectric carrier and configured to radiate a second signal in a same frequency band as the first signal;

a transceiver circuit configured to control a signal to be radiated through at least one of the first antenna or the second antenna; and a baseband processor configured to communicate with at least one of an adjacent vehicle, a Road Side Unit (RSU), or a base station through the transceiver circuit, wherein another side of the first dielectric carrier is disposed on the circuit board and the first antenna forms a first radiation pattern, wherein a rear surface of the second dielectric carrier is disposed on the circuit board and the second antenna forms a second radiation pattern, and wherein a peak at elevation angle of the second radiation pattern is different from a peak at elevation angle of the first radiation pattern.

18. The vehicle of claim 17, further comprising a dielectric cover configured to cover a central region and side regions of the circuit board opposite each other with respect to the central region, wherein the dielectric cover includes a flat cover region and a slanted cover region having a slanted surface, wherein the first antenna is disposed at a first height and disposed at the central region covered by the flat cover region, wherein the second antenna is disposed at a second height lower than the first height and disposed at a remote keyless entry (RKE) region disposed on one side of the circuit board covered by the slanted cover region.

19. The vehicle of claim 17, further comprising:

a third antenna connected to a third feeder of the circuit board, comprising a third metal patch disposed at a front surface and a side surface of a third dielectric carrier and configured to radiate a third signal; and a fourth antenna connected to a fourth feeder of the circuit board, comprising a fourth metal patch disposed at a front surface and a side surface of a fourth dielectric carrier and configured to radiate a fourth signal, wherein the third antenna is disposed in an antenna region corresponding to a central region of the circuit board, and wherein the fourth antenna is disposed in a remote keyless entry (RKE) region disposed at another side of the circuit board.

20. The vehicle of claim 19, further comprising:

a fifth antenna connected to a fifth feeder of the circuit board, comprising a fifth metal patch disposed at a front surface and a side surface of a fifth dielectric carrier and configured to radiate a fifth signal; and a sixth antenna connected to a sixth feeder of the circuit board, comprising a sixth metal patch disposed at a front surface and a side surface of a sixth dielectric carrier and configured to radiate a sixth signal, wherein the fifth antenna and the sixth antenna are disposed in the antenna region corresponding to the central region of the circuit board, and wherein the baseband processor performs 4×4 MIMO through the first antenna, the second antenna, the fifth antenna, and the sixth antenna.

* * * * *